US009429362B2

(12) United States Patent
Kanai

(10) Patent No.: US 9,429,362 B2
(45) Date of Patent: Aug. 30, 2016

(54) DRYING APPARATUS

(71) Applicant: Masao Kanai, Kanagawa (JP)

(72) Inventor: Masao Kanai, Kanagawa (JP)

( * ) Notice: Subject to any disclaimer, the term of this patent is extended or adjusted under 35 U.S.C. 154(b) by 103 days.

(21) Appl. No.: 14/401,537

(22) PCT Filed: May 20, 2013

(86) PCT No.: PCT/JP2013/063904
§ 371 (c)(1),
(2) Date: Nov. 17, 2014

(87) PCT Pub. No.: WO2013/176072
PCT Pub. Date: Nov. 28, 2013

(65) Prior Publication Data

US 2015/0153103 A1 Jun. 4, 2015

(30) Foreign Application Priority Data

May 21, 2012 (JP) ................................ 2012-115882
Oct. 31, 2012 (JP) ................................ 2012-240301

(51) Int. Cl.
*F26B 17/12* (2006.01)
*F26B 17/00* (2006.01)
(Continued)

(52) U.S. Cl.
CPC ................. *F26B 17/00* (2013.01); *F26B 3/22* (2013.01); *F26B 17/22* (2013.01); *F26B 25/04* (2013.01)

(58) Field of Classification Search
CPC .......... F26B 3/00; F26B 11/00; F26B 17/00; F26B 17/12; B04B 5/00; B04B 5/12; B65B 5/00; B65B 5/12
USPC .................... 34/59, 168, 173; 159/4.02, 16.1
See application file for complete search history.

(56) References Cited

U.S. PATENT DOCUMENTS 4,130,944 A * 12/1978 Hultsch ................... F26B 7/007 34/323
4,565,015 A * 1/1986 Hundley, III ............. B29B 9/16 34/175

(Continued)

FOREIGN PATENT DOCUMENTS

EP 2853848 A1 * 4/2015 ............. F26B 17/22
JP H03-19501 U 2/1991

(Continued)

OTHER PUBLICATIONS

International Search Report for PCT/JP2013/063904, Jun. 11, 2013.

*Primary Examiner* — Stephen M Gravini
(74) *Attorney, Agent, or Firm* — Kubotera & Associates, LLC

(57) ABSTRACT

Provided is a drying apparatus with which, in the case where rotating vane assemblies are vertically arranged in a plurality of stages, and a spacing (clearance) between stages is to be set depending upon a specific one of the various types of materials to be dried, always allows an optimum dimension to be easily provided, thereby an extremely high drying efficiency based on the advantage of the vertical type can be easily implemented.

With a drying apparatus 10, rotating vane assemblies 21, 210 each constituted by a plurality of circular-arc vane sections 22, 220 are disposed in a plurality of stages vertically arranged along a rotating axle 20 in a vertical cylindrical drying vessel 11. The clearance F between any two adjoining stages of the plurality of stages of the rotating vane assembly 21, 210 is set at 0 to 15% of the diameter of a circle connecting between the outermost peripheral edges of the adjacent flat surfaces 23, 230 of the circular-arc vane sections 22, 220.

2 Claims, 12 Drawing Sheets

(51) Int. Cl.

| | |
|---|---|
| ***F26B 17/22*** | (2006.01) |
| ***F26B 3/22*** | (2006.01) |
| ***F26B 25/04*** | (2006.01) |

(56) References Cited

U.S. PATENT DOCUMENTS

| | | | | |
|---|---|---|---|---|
| 5,074,057 | A * | 12/1991 | Kanai | F26B 11/14 34/147 |
| 5,263,267 | A * | 11/1993 | Buttner | F26B 17/20 34/179 |
| 5,426,866 | A * | 6/1995 | Rumocki | B04B 15/12 210/609 |
| 5,586,396 | A | 12/1996 | Kanai | |
| 5,632,102 | A * | 5/1997 | Luy | B01J 2/16 34/372 |
| 5,638,606 | A * | 6/1997 | Bryan | F26B 5/08 34/147 |
| 6,282,809 | B1 * | 9/2001 | Sunde | F26B 5/04 34/135 |
| 6,379,629 | B1 * | 4/2002 | Kanai | C10B 7/02 201/13 |
| 7,024,794 | B1 * | 4/2006 | Mynes | F26B 17/24 210/374 |
| 7,171,762 | B2 * | 2/2007 | Roberts | B29B 9/16 34/166 |
| 7,625,532 | B2 * | 12/2009 | Bridgwater | B01J 8/10 202/100 |
| 8,037,618 | B2 * | 10/2011 | Hehenberger | B29B 9/16 166/245 |
| 8,151,482 | B2 * | 4/2012 | Moss | F26B 3/06 159/16.1 |
| 8,464,437 | B1 * | 6/2013 | Weisselberg | F26B 17/003 110/219 |
| 8,567,086 | B2 * | 10/2013 | Kanai | F26B 17/24 34/102 |
| 8,959,790 | B2 * | 2/2015 | Anerud | F16L 3/00 162/359.1 |
| 2002/0062576 | A1 * | 5/2002 | Sandford | F26B 5/08 34/168 |
| 2014/0237839 | A1 * | 8/2014 | Bloch | F22B 37/486 34/92 |
| 2015/0153103 | A1 * | 6/2015 | Kanai | F26B 17/22 34/165 |

FOREIGN PATENT DOCUMENTS

| | | | | |
|---|---|---|---|---|
| JP | H06-210268 | A | 8/1994 | |
| JP | H07-6683 | U | 1/1995 | |
| JP | H08-52301 | A | 2/1996 | |
| JP | 2840639 | B2 | 12/1998 | |
| JP | 2958869 | B2 | 10/1999 | |
| JP | 2003-148866 | A | 5/2003 | |
| KR | 20150013851 | A * | 2/2015 | F26B 17/22 |
| WO | WO 2013176072 | A1 * | 11/2013 | F26B 17/22 |

* cited by examiner

DRYING APPARATUS

TECHNICAL FIELD

The present invention relates to a drying apparatus for drying a material to be dried which has been charged into a vertical cylindrical drying vessel, by raising the material to be dried while pressing it against a heat-transmitting face of the inner wall of the drying vessel.

BACKGROUND ART

Conventionally, as this type of drying apparatus, apparatuses for drying a wide variety of materials to be dried, such as granular, powdered, liquid, and massive materials to be dried. Particularly, the present applicant has already proposed drying apparatuses which can implement ideal drying conditions on the basis of a unique blade called Cyclofin (for example, refer to Patent Documents 1 and 2).

In other words, with such drying apparatuses, a material to be dried which has been charged into a vertical cylindrical drying vessel is raised by revolution of a plurality of circular-arc vane sections constituting a rotating vane assembly mounted to a rotating axle, being pressed against a heat-transmitting face of the inner wall of the drying vessel in a thin film state by the centrifugal force, and in addition to this, with an action exerted by a subsequently raised material to be dried to push up a previously raised material to be dried upward, thereby the material to be dried being efficiently dried.

These drying apparatuses have been proposed to solve the problems faced by a drying apparatus having a vertical spiral rotation blade that had been proposed by the present applicant before these drying apparatuses (for example, refer to Patent Document 3), in other words, those of how to prevent a highly viscous material to be dried from adhering to and residing on the blade and the heat-transmitting face; how to prevent a solid substance from being bitten into the clearance between the circular-arc vane section and the heat-transmitting face; how to improve the efficiency of raising the material to be dried; how to effectively utilize the entire face of the heat-transmitting face for improving the drying efficiency; and the like.

Further, the rotating vane assembly is not limited to a single-stage one, and there has been disclosed a multi-stage rotating vane assembly which is configured so as to be arranged in a plurality of stages in a vertical direction. By thus configuring the rotating vane assembly to form a plurality of stages, the material to be dried is raised in sequence by the circular-arc vane section at each stage, while being pressed against the heat-transmitting face to be dried, and then being raised by the circular-arc vane section at the highest stage, thereby a material which has been dried being obtained. In other words, the multi-stage rotating vane assembly has been designed such that the material to be dried is continuously raised while being dried from a bottom portion to an upper portion of the drying vessel.

CITATION LIST

Patent Literature

Patent Document 1: Japanese Patent No. 2840639

Patent Document 2: Japanese Patent No. 2958869

Patent Document 3: Japanese Patent Application Laid-open No. H03-19501

SUMMARY OF INVENTION

The drying apparatuses disclosed in the above-mentioned Patent Documents 1 and 2 have been those which, by configuring the rotating vane assembly to form a multi-stage one, the drying efficiency can be further enhanced, however, there have newly occurred some problems which are attributable to configuring the rotating vane assembly to form a multi-stage one.

In other words, by continuously raising the material to be dried from the rotating vane assembly at the lowest stage to the rotating vane assembly at the highest stage, an extremely high drying efficiency on the basis of the advantage of the vertical type can be implemented, however, in order to raise the material to be dried at each of the stages in sequence, the spacing (clearance) between stages is extremely important, thereby there having occurred a problem that it is extremely difficult to set the spacing at a specific dimension.

The present invention has been made in view of the above-described problem of the prior art, and it is an object of the present invention to provide a drying apparatus with which, in the case where rotating vane assemblies are vertically arranged in a plurality of stages and a spacing (clearance) between stages is to be established depending upon a specific one of the various types of materials to be dried, always allows an optimum dimension to be easily provided, thereby an extremely high drying efficiency based on the advantage of the vertical type can be easily implemented.

Means for Solving the Problem

The inventor et al. have carried out intensive studies about the drying apparatus, and have found that, with a drying apparatus equipped with a plurality of rotating vane assemblies in the internal portion of a vertical cylindrical drying vessel, in the case where the plurality of rotating vane assemblies have been formed in a plurality of stages which are vertically arranged, setting the spacing (clearance (F)) between stages at an appropriate value will allow an extremely high drying efficiency on the basis of the advantage of the vertical type can be implemented.

Being based on such a conclusion, the subject matters of the present invention to achieve the above object are disclosed in the following respective aspects of the present invention:

[1]. A drying apparatus, including a vertical cylindrical drying vessel, a material to be dried being charged thereinto; a heating means for heating a heat-transmitting face of the inner wall of the drying vessel; and a plurality of rotating vane assemblies, being mounted to a rotating axle provided in a central area of the drying vessel and extending in a vertical direction, the plurality of rotating vane assemblies each being comprised of a plurality of circular-arc vane sections disposed so as to be arranged in a circumferential direction around the rotating axle; the plurality of circular-arc vane sections each providing a flat surface extending in a circumferential direction in a plan view, the flat surface being capable of placing the material to be dried thereon from one end part thereof and moving the material to be dried to the other end part thereof while raising the material to be dried, the flat surface being formed so as to extend obliquely upward from one end part thereof to the other end part thereof in a direction reverse to the rotating direction of the rotating axle;

the plurality of rotating vane assemblies being disposed in a plurality of stages vertically arranged along the rotating axle, and by revolution of the rotating axle, each of the plurality of circular-arc vane sections of each of the rotating vane assemblies forming a plurality of stages being rotated, thereby a drying process moving the material to be dried from one end part to the other end part of the flat surface of each of the plurality of circular-arc vane sections while raising the material to be dried, and pressing the material to be dried against the heat-transmitting face in a thin film state by the centrifugal force being executed;

the clearance between any two adjoining stages of the plurality of stages of the rotating vane assembly being a dimension from the uppermost end at the other end part of a particular circular-arc vane section of a rotating vane assembly to the lowermost end at one end part of a particular circular-arc vane section of the rotating vane assembly one stage thereabove, the dimension being set at 0 to 15% of the diameter of a circle connecting between the adjacent outermost peripheral edges of the flat surfaces of the circular-arc vane sections so as for the drying process to be repeated in a continuous manner in sequence from the rotating vane assembly at the lowest stage to the rotating vane assembly at the highest stage;

above the rotating vane assembly at the highest stage, there being disposed a receiving plate provided on the inner wall of the drying vessel for receiving the material to be dried being moved to above the rotating vane assembly at the highest stage while being pressed against the heat-transmitting face in a thin film state, and causing the material to be dried to be dropped down through the inside of the respective rotating vane assemblies, the receiving plate being formed of a plate-like member, a face thereof vertically extending in a small width shape being disposed so as to be faced opposite to the rotating direction of the rotating vane assembly, two or more receiving plates being arranged with an equal spacing in a circumferential direction.

[2]. The drying apparatus according to [1], wherein the rotating vane assemblies forming a plurality of stages are disposed in such a manner that they are arranged along the rotating axle in the form of a multiple spiral staircase, with the respective circular-arc vane sections at any two adjoining stages being shifted in angular position by a prescribed angle in a plan view, extending in a direction reverse to the rotating direction, the flat surface of each circular-arc vane section of the rotating vane assemblies extends in a small-width shape to a certain length within a circumferential range of 360 degrees in a plan view; the length being set to be a length with which the flat surfaces of the adjoining circular-arc vane sections arranged on the same circumference in a plan view of the rotating vane assembly at a particular stage other than the lowest stage will not be overlapped upon each other in a circumferential direction; and with the rotating vane assemblies forming a plurality of stages, the circular-arc vane sections at any two adjoining stages are disposed in such a manner that they are arranged in the form of the multiple spiral staircase, one end part of the upper circular-arc vane section located the closest to the other end part of a particular lower circular-arc vane section in a direction reverse to the rotating direction being shifted toward the reverse direction by a prescribed angle so as for such end parts not to overlap one upon another in a plan view, and being located beneath an inclined plane formed by extending the flat surface at the other end part of the lower circular-arc vane section.

Next, the function on the basis of the means for solving the problem will be explained.

With the drying apparatus (10, 10A, 10B) in accordance with the present invention, it is the most important that the material to be dried is brought into contact with the heat-transmitting face (12) of the inner wall of the vertical cylindrical drying vessel (11, 11A, 11B), being pressed thereagainst in a thin film state in a circumferential and horizontal direction, and such contact is continuously repeated, while the material to be dried being raised in a vertical direction. Here, the contact in a circumferential and horizontal direction results from the centrifugal force generated by the revolution of the rotating vane assembly (21, 210, 31, 310) (pressing action), and the climbing of the material to be dried in a vertical direction is attributable to the angle of the circular-arc vane section in addition to the centrifugal force (raising action).

By the way, the type of material to be dried from which the moisture is to be removed with the present drying apparatus (10, 10A, 10B) varies, and the water content or weight of the material to be dried is not limited to a constant one. Further, at the beginning of the drying operation, even the same material to be dried has yet a high water content and a significant weight, causing the centrifugal force to be easily generated, and tending to be raised by inertia to a certain degree, however, as the moisture evaporation is progressed with the drying, the weight is decreased, the centrifugal force becoming difficult to be generated, and the climbing force in a vertical direction becoming insufficient. In view of such a fact, it has been an important problem how a wide variety of materials to be dried can be pressed against the heat-transmitting face (12) in a thin film state from the beginning of the drying operation to the last, and raised in a vertical direction.

If the spacing between any two adjoining stages of the stages of the rotating vane assemblies (21, 210, 31, 310) vertically arranged is fixed, the raising action for raising the material to be dried in a vertical direction is in a close relation to the number of revolutions (circumferential speed), which is dependent upon the diameter of the rotating vane assembly (21, 210, 31, 310), and even if such a correlation is slightly varied, the material to be dried can be easily raised to a level as high as ½ to ⅔ of the diameter of the rotating vane assembly (21, 210, 31, 310), provided that the pressing action is not particularly taken into account.

However, with such a degree of climbing alone, the area measured in a vertical direction of the heat-transmitting face (12) that is left not to have been contacted with the material to be dried is relatively large, which means that the entire face of the heat-transmitting face (12) is not effectively utilized, thereby improvement of the drying efficiency on the basis of the advantage of the vertical type having not been expected. Here, in order to further raise the material to be dried in a vertical direction, utilization of the centrifugal force by the revolution of the rotating vane assembly (21, 210, 31, 310) and devising an angle of the circular-arc vane section alone have provided a limitation.

Then, the inventor et al. conducted various experiments, and thus have found that, in order to further raise the material to be dried in a vertical direction, in other words, enhance the raising force, the clearance F between any two adjoining stages of the stages of the rotating vane assembly (21, 210, 31, 310) is important. In consideration of the initial moisture content of the material to be dried, and the gradual decrease in moisture content with the progress of the drying, resulting in the initial centrifugal force and inertia being gradually decreased, by setting the clearance (F) between any two adjoining stages as appropriate, the material to be dried could have been raised to a level as high as 3 to 4 times the diameter of the rotating vane assembly (21, 210, 31, 310).

However, it has been found that, if only the raising action for raising the material to be dried in a vertical direction is considered, and the pressing action for pressing the material to be dried against the heat-transmitting face (12) in a thin film state is not taken into account, the following problems occur. In other words, there have been found the facts that, even if the material to be dried can be raised high in a vertical direction, the material to be dried will not be brought into a thin film state with respect to the heat-transmitting face (12) at each stage; the material to be dried will be brought into a dumpling-like state in the course of drying rather than into a thin film state; and as the drying of the material to be dried is further progressed, resulting in the moisture being lost, the material to be dried is lowered down along the heat-transmitting face (12), resulting in the material to be dried being not effectively contacted with the heat-transmitting face (12), thereby the drying efficiency being lowered down to ½ to ⅓.

On the basis of the above verification, the inventor et al. have carried out intensive studies, and at this time have made it clear that, in order to achieve both optimum pressing action and raising action, setting the clearance (F) between any two adjoining stages of the stages of the rotating vane assembly (21, 210, 31, 310) at an optimum value is important, and this optimum value is 0 to 15% of the diameter of the rotating vane assembly (21, 210, 31, 310). If the value of the clearance F is in such a range, it is made possible that, at every stage from the rotating vane assembly (21, 31) at the lowest stage to the rotating vane assembly (210, 310) at the highest stage, the material to be dried is pressed against the heat-transmitting face (12) in a uniform thin film state, and also raised in an optimum time in sequence.

With the drying apparatus (10, 10A, 10B) according to the [1], which has been obtained as a result of the above-mentioned intensive studies, when the circular-arc vane sections (22, 220, 32, 320) of each of the rotating vane assemblies (21, 210, 31, 310) forming a plurality of stages are rotated, the respective flat surfaces (23, 230, 33, 330) raise the material to be dried, while pressing the material to be dried against the inner wall of the heat-transmitting face (12) of the drying vessel (11, 11A, 11B) in a thin film state for drying the material to be dried. With such a drying process, even if the material to be dried is highly viscous, it will not easily adhere to any particular circular-arc vane section (22, 220, 32, 320) or the heat-transmitting face (12), and if the material to be dried Should adhere thereto, it is raised by the pertinent circular-arc vane sections (22, 220, 32, 320) to thereby climb over the entire face of the heat-transmitting face (12) without staying.

Moreover, the flat surface (23, 230, 33, 330) of a particular circular-arc vane section (22, 220, 32, 320), which, to the material to be dried, imparts the raising action and the pressing action against the heat-transmitting face (12) by the centrifugal force, has an elongated shape along the heat-transmitting face (12), extending obliquely upward from one end part thereof to the other end part thereof, and therefore the material to be dried is not subjected to an impact alone, but effectively being raised and pressed against the heat-transmitting face 12.

Further, with the rotating vane assemblies (21, 210, 31, 310) being provided in a plurality of stages in a vertical direction, the material to be dried is raised at every stage, while being pressed against the heat-transmitting face (12) in a thin film state, in such a manner that the material to be dried which has been previously raised is raised to the stage one-stage above, being pushed up by the material to be dried which is subsequently raised. Thus, from the rotating vane assembly (21, 31) at the lowest stage to the rotating vane assembly (210, 310) at the highest stage, the material to be dried can be continuously dried, while being raised in sequence, thereby the entire face of the heat-transmitting face (12) provided for the inner wall of the drying vessel (11, 11A, 11B) in a vertical direction thereof is effectively utilized, and thus an extremely high drying efficiency on the basis of the advantage of the vertical type can be reliably implemented.

Here as described above, the clearance (F) between any two adjoining stages of the stages of the rotating vane assembly (21, 210, 31, 310) becomes important, however, by setting the value of such clearance (F) at 0 to 15% of the diameter of the rotating vane assembly (21, 210, 31, 310), it is made possible that, at every stage from the rotating vane assembly (21, 31) at the lowest stage to the rotating vane assembly (210, 310) at the highest stage, the material to be dried is pressed against the heat-transmitting face (12) in a uniform thin film state, and also raised in an optimum time in sequence. It is recommended that the value of the clearance (F) between any two adjoining stages of the stages of the rotating vane assembly (21, 210, 31, 310) be appropriately set in such a range in accordance with the specific type of material to be dried.

Assuming that the clearance (F) is smaller than an optimum value which is suited for a given type of material to be dried, the material to be dried will be too easily raised, thereby the time to spare for being pressed against the heat-transmitting face (12) of the inner wall of the drying vessel (11, 11A, 11B) in a uniform thin film state being eliminated, and thus at each stage, most of the material to be dried being immediately raised. Contrarily, if the clearance (F) is too large, the material to be dried will not be successfully transferred upward at every stage, resulting in the climbing being stopped on the way. Further, if the value of the clearance (F) is determined by half-measures, the entire drying vessel (11, 11A, 11B) cannot still be effectively utilized.

The material to be dried which is moved to above the rotating vane assembly (210) at the highest stage, being pressed against the heat-transmitting face (12) in a thin film state, is received by the receiving plate (30) provided on the inner wall of the drying vessel (11), thereby being prevented from taking its natural climbing course, and being caused to be dropped down through the inside of the respective rotating vane assemblies (210). Thereby, the process of drying the material to be dried is again performed from the rotating vane assembly (21) at the lowest stage, whereby the drying efficiency can be further enhanced.

Further, the relative arrangement of the circular-arc vane sections (22, 220, 32, 320) between any two adjoining stages of the stages of the rotating vane assembly (21, 210, 31, 310) is important, and specifically, as stated in the [2], the rotating vane assemblies (21, 210, 31, 310) forming a plurality of stages are disposed so as to be arranged along the rotating axle (20) in the form of a multiple spiral staircase, with the respective circular-arc vane sections (22, 220, 32, 320) at any two adjoining stages being shifted in angular position by a prescribed angle in a plan view, extending in a direction reverse to the rotating direction (R).

With such a special arrangement, the material to be dried which has been charged into the drying vessel (11, 11A, 11B) is dried, while being moved in sequence from the rotating vane assembly (21, 31) at the lowest stage toward the rotating vane assembly (210, 310) at the highest stage in such a manner that the material to be dried climbs a multiple spiral staircase in which the respective circular-arc vane sections (22, 220, 32, 320) are intermittently continued. Further, the material to be dried can be replenished with a climbing force and a centrifugal force through the revolution of the rotating vane assembly (210, 310) at the second and subsequent stages. In this way, the present invention allows effective utilization of the entire face of the heat-transmitting face (12) provided for the inner wall of the drying vessel (11, 11A, 11B) in a vertical direction thereof, whereby an extremely high drying efficiency on the basis of the advantage of the vertical type can be reliably implemented.

Further, since the flat surfaces (23, 230, 33, 330) of the respective circular-arc vane sections (22, 220, 32, 320) of the rotating vane assembly (21, 210, 31, 310) have a certain length within a circumferential range of 360 degrees in a plan view, being mutually independent, the clearance U between the outer peripheral edge of the flat surface (23, 230, 33, 330) of the respective circular-arc vane sections (22, 220, 32, 320) and the heat-transmitting face (12) is not contiguous, and therefore even if a foreign matter in the material to be dried is bitten in the clearance (U), it will immediately get out of the clearance (U), the biting being not continued.

Describing in detail about the special arrangement, with the rotating vane assemblies (21, 210, 31, 310) forming a plurality of stages, the circular-arc vane sections (22, 220, 32, 320) at any two adjoining stages are disposed in such a manner that they are arranged in the form of the multiple spiral staircase, one end part of the upper circular-arc vane section (220, 320) located the closest to the other end part of a particular lower circular-arc vane section (22, 220, 32, 320) in a direction reverse to the rotating direction (R) being shifted toward the reverse direction by a prescribed angle so as for such end parts not to overlap one upon another in a plan view in such a manner that the one end part of the upper circular-arc vane section (220, 320) is located beneath an inclined plane formed by extending the flat surface (23, 230, 33, 330) at the other end part of the lower circular-arc vane section (22, 220, 32, 320). Thereby, the material to be dried which is raised by the circular-arc vane section (22, 220, 32, 320) at a particular stage, and is moved obliquely upward can be reliably transferred to one end part 220*a* of the circular-arc vane section (220, 320) at the stage just thereabove.

With the drying apparatus in accordance with the present invention, in the case where rotating vane assemblies are vertically arranged in a plurality of stages and the spacing (clearance) between stages is to be set depending upon a particular one of the various types of materials to be dried, an optimum dimension can always be easily provided, thereby an extremely high drying efficiency based on the advantage of the vertical type can be easily implemented.

The material to be dried which is moved to above the rotating vane assembly at the highest stage is received by the receiving plate provided on the inner wall of the drying vessel, thereby being prevented from taking its natural climbing course, and being caused to be dropped down through the inside of the respective rotating vane assemblies, and thus, the process of drying the material to be dried is again performed from the rotating vane assembly at the lowest stage, whereby the drying efficiency can be further enhanced.

Further, by devising a relative arrangement of the circular-arc vane sections at any two adjoining stages, the material to be dried can be smoothly raised between any two adjoining stages in sequence, whereby an extremely high drying efficiency on the basis of the advantage of the vertical type can be reliably implemented.

MODES FOR CARRYING OUT THE INVENTION

Hereinbelow, various embodiments representing the present invention will be explained with reference to the drawings.

FIG. 1 to FIG. 10 show a first embodiment of the present invention.

Figure 1:
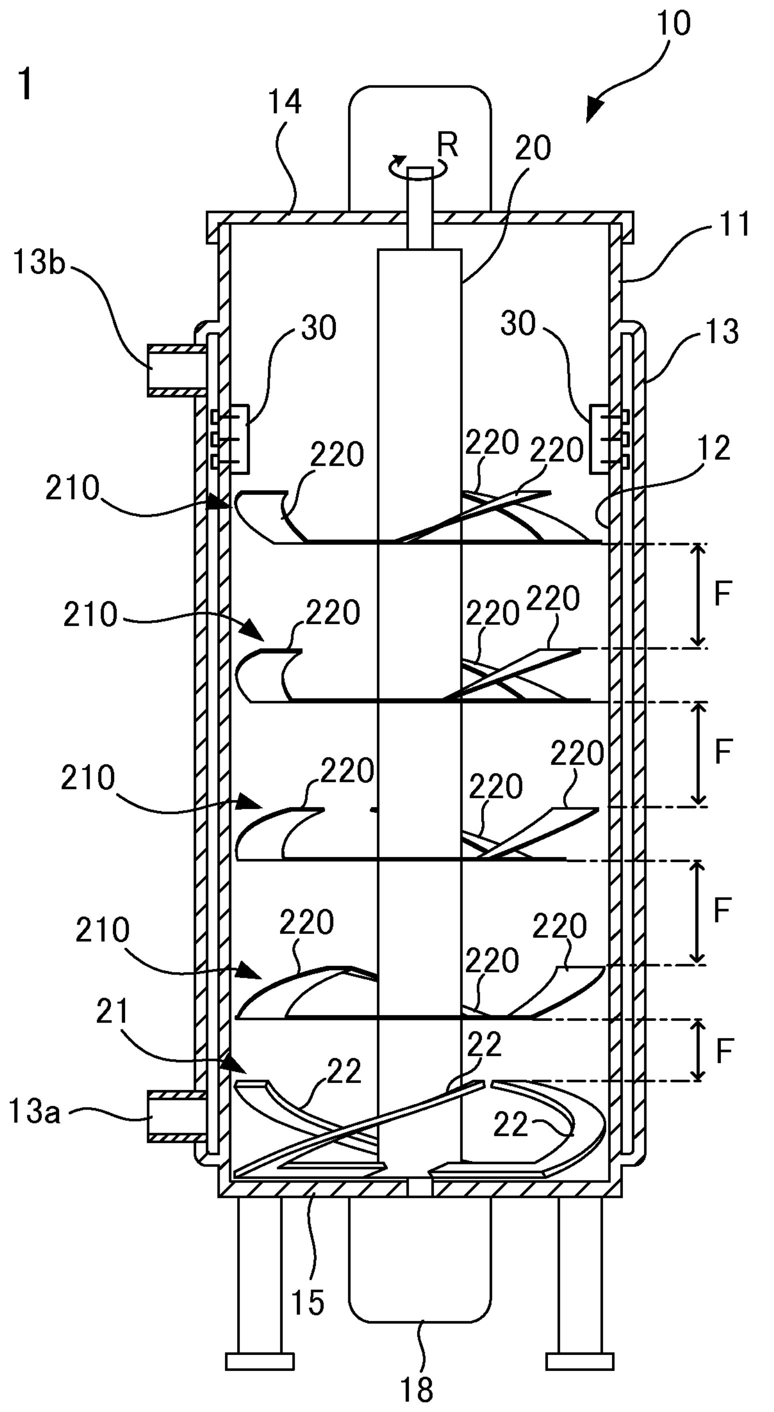
FIG. 1 is a vertical sectional view showing the internal construction of a drying apparatus according to a first embodiment of the present invention.

As shown in FIG. 1, a drying vessel 11 providing a critical portion of a drying apparatus 10 is configured in a cylindrical geometry of vertical type. The material to be dried which is charged into the inside of this drying vessel 11 greatly varies, including garbage, leftovers, food residue, slime, sludge, and livestock excreta, and the form thereof is also various, being granular, powdered, liquid, massive, or the like, with the moisture content greatly varying. The present drying apparatus 10 can accommodate any types of material to be dried.

The cylindrical inner wall of the drying Vessel 11 provides a heat-transmitting face 12 which transmits heat from a heat-supplying means to the material to be dried. The heat-supplying means includes, for example, a jacket 13 which is formed so as to surround the outer periphery of the drying vessel 11, and a boiler (not shown) which is connected to this jacket 13, and delivers steam into the inside of the jacket 13. The jacket 13 is provided with a steam inlet 13*a* which leads steam into the jacket 13, and a steam outlet 13*b* which discharges the steam to the outside of the jacket 13.

Alternatively, the heat-supplying means may be configured such that, instead of steam, hot air is fed into the jacket 13, or it may be constituted by a heat medium housed inside of the jacket 13, and an electric heater disposed around the outer periphery of the jacket 13; in this scheme, the heat from the electric heater is transmitted to the heat-transmitting face 12 through the heat medium, and if this scheme is to be further simplified, the heat from the electric heater disposed around the outer periphery of the jacket 13 may be directly transmitted to the heat-transmitting face 12. Thus, the heat-supplying means is available as those of various schemes.

The scheme for supplying a material to be dried to the inside of the drying vessel 11 or discharging the dried material to the outside thereof can vary, and for example, it is recommended that a supply opening (not shown) which can be opened and closed be provided in a part of a top cover 14 of the drying vessel 11, and from this supply opening, the material to be dried be charged into the inside. On the other hand, it is recommended that a discharging port (not shown) which can be opened and closed be provided in the vicinity of a bottom plate 15 of the heat-transmitting face 12, and from this discharging port, the dried material be discharged to the outside. With such a scheme, batch type processing is performed, in which the material to be dried is not supplied or discharged on the way until all the processes are completed.

Figure 11:
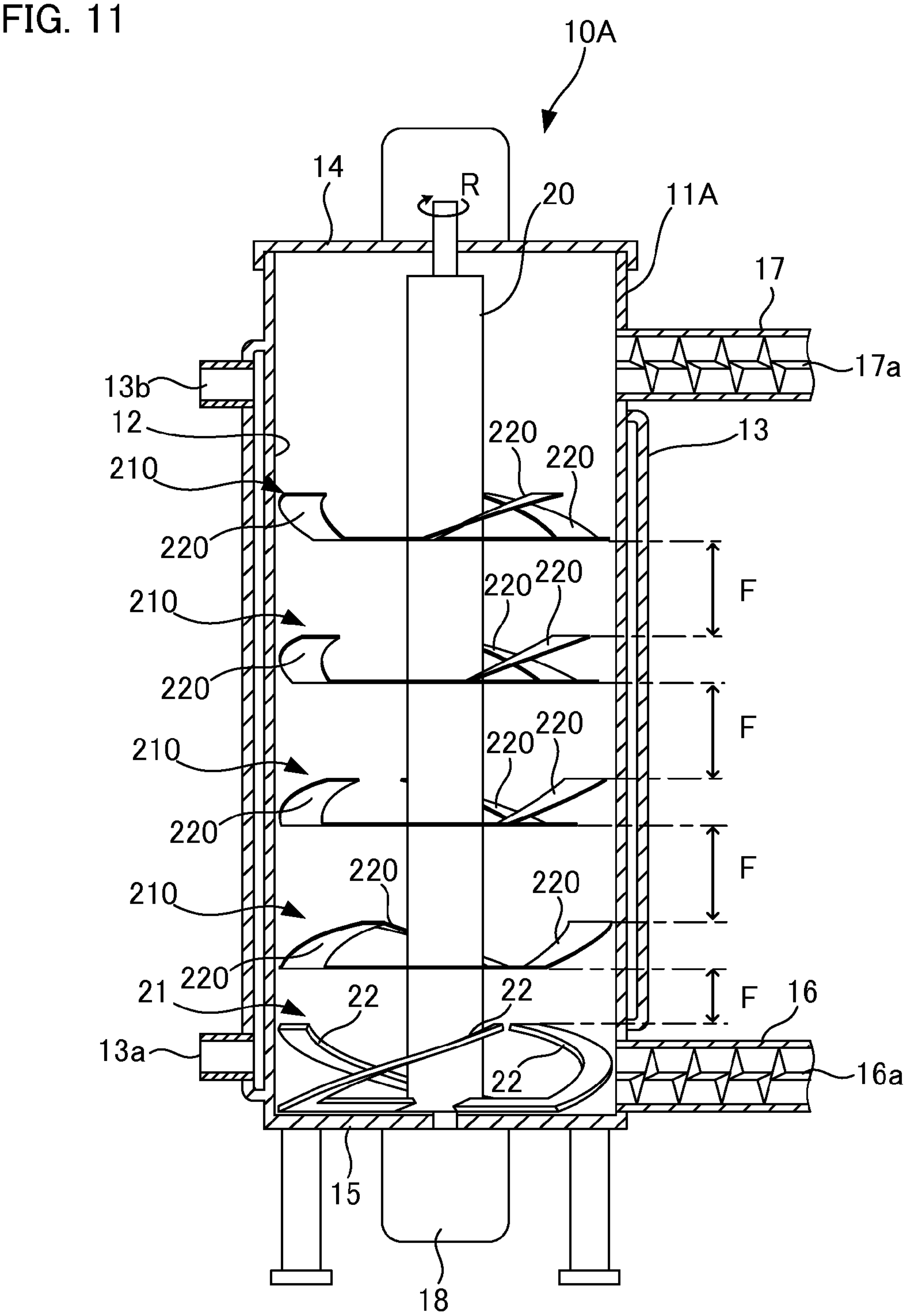
FIG. 11 is a vertical sectional view showing the internal construction of a drying apparatus according to a second embodiment of the present invention.

Or alternatively, like a later-described drying apparatus 10A according to a second embodiment as shown in FIG. 11, a feed tube 16 may be connected to the drying vessel 11 in the vicinity of the bottom plate 15 thereof for supplying the material to be dried into the bottom portion inside the drying vessel 11 by means of a feed screw 16*a*. On the other hand, in the vicinity of the top cover 14 of the heat-transmitting face 12, a delivery tube 17 is connected for discharging the dried material to the outside by means of a delivery screw 17*a*. With such a scheme, continuous type processing can be performed, in which the drying process is executed, while the material to be dried is continuously supplied, and the dried material is continuously discharged.

Further, in a central area of the drying vessel 11, there is disposed a rotating axle 20, which extends in a vertical direction. This rotating axle 20 is pivotally supported so as to pass through the centers of the top cover 14 of the heat-transmitting face 12 and the bottom plate 15. In the middle of the rotating axle 20, rotating vane assemblies 21, 210 are mounted, being vertically arranged to provide a plurality of stages. The lower end part of the rotating axle 20 is power-transmittably connected to an electric motor 18, which is disposed on the outside of the bottom plate 15 of the drying vessel 11, and with the electric motor 18 being run, the rotating axle 20 is rotated, thereby the rotating vane assemblies 21, 210 forming a plurality of stages being synchronously rotated.

The rotating vane assemblies 21, 210 are each comprised of a plurality of circular-arc vane sections 22, 220, which are disposed so as to be arranged in a circumferential direction around the rotating axle 20, and in the present embodiment, the number of circular-arc vane sections 22, 220 is three. Of the rotating vane assemblies 21, 210 forming a plurality of stages, the rotating vane assembly 21 at the lowest stage and the rotating vane assembly 210 at the other stages are different from each other in the length of the circular-arc vane section. In other words, the circular-arc vane section 22 of the rotating vane assembly 21 at the lowest stage is formed longer than the circular-arc vane section 220 of the rotating vane assembly 210 at the other stages. Hereinbelow, the configuration of the rotating vane assembly 21, which is considered to represent the rotating vane assemblies 21, 210, will be explained in detail.

Figure 2:
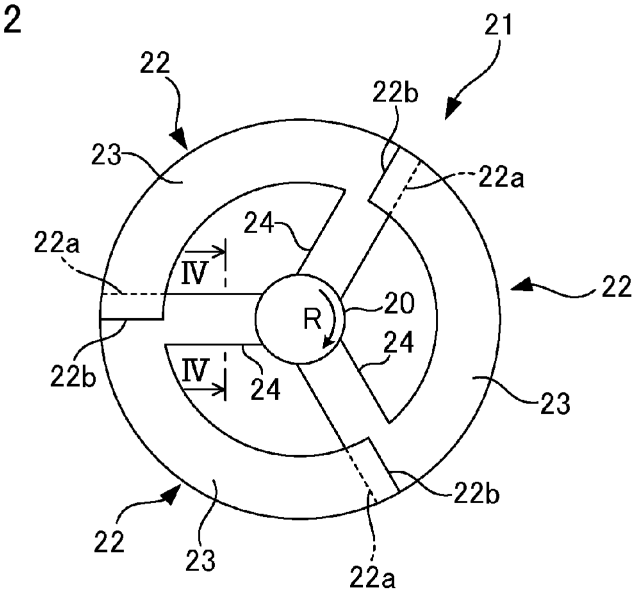
FIG. 2 is a plan view showing a rotating vane assembly at the lowest stage that is provided in the drying apparatus according to the first embodiment of the present invention.
Figure 3:
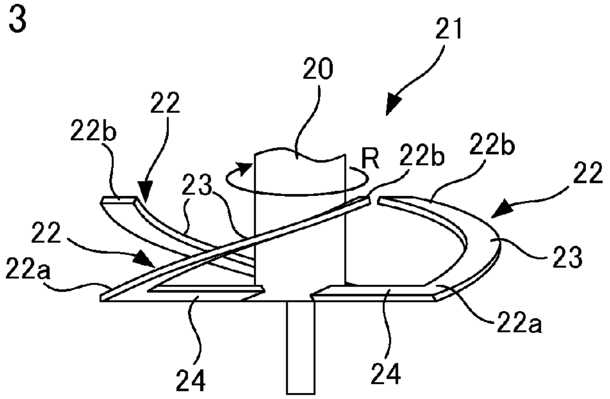
FIG. 3 is a side view showing a rotating vane assembly at the lowest stage that is provided in the drying apparatus according to the first embodiment of the present invention.
Figure 4:
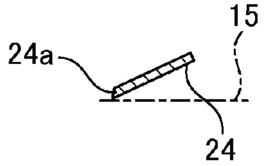
FIG. 4 is a sectional view along a line IV-IV in FIG. 2.

As shown in FIG. 2 to FIG. 4, the circular-arc vane sections 22 constituting the rotating vane assembly 21 at the lowest stage each have the same geometry, each providing a flat surface 23 which extends in a circumferential direction in a plan view, being capable of placing a material to be dried thereon from one end part 22*a* thereof and moving it to the other end part 22*b* thereof while raising the material to be dried. This flat surface 23 is formed so as to extend obliquely upward from one end part 22*a* thereof to the other end part 22*b* thereof toward a direction reverse to the rotating direction R. In other words, each circular-arc vane section 22 is configured so as to place the material to be dried on the flat surface 23 for raising it, while pressing it against the heat-transmitting face 12 by the centrifugal force P (refer to FIG. 10).

More particularly, the flat surface 23 of each circular-arc vane section 22 extends in a fixed width to a certain length within a circumferential range of 360 degrees in a plan view, the outer peripheral edge of the flat surface 23 being formed in an arc along a cylindrical geometry of the heat-transmitting face 12. Between the outer peripheral edge of this flat surface 23 and the heat-transmitting face 12, there is formed a clearance U (refer to FIG. 10) allowing each circular-arc vane section 22 to be rotated. The clearance U need not be fixed from one end part 22*a* of the circular-arc vane section 22 to the other end part 22*b*, and for example, may be set so as to be gradually increased toward a direction reverse to the rotating direction R of the circular-arc vane section 22.

Further, only with the rotating vane assembly 21 at the lowest stage, the other end part 22*b* of the respective circular-arc vane sections 22 is configured such that it is located higher than one end part 22*a* of the other circular-arc vane section 22 which is adjacent thereto in a direction reverse to the rotating direction R, being overlapped thereupon in a plan view. In other words, the length of each circular-arc vane section 22 is provided as a length covering an angle range of approx. 120 degrees in a plan view that is given by dividing 360 degrees into approximately three equal parts. On the other hand, the configuration of each circular-arc vane section 220 in the rotating vane assembly 210 at the stages other than the lowest stage is basically the same as that of the each circular-arc vane section 22, however, the length of the circular-arc vane section 220 is set to be shorter than that of the circular-arc vane section 22.

With the rotating vane assembly 210 at the other stages, the flat surface 230 of each circular-arc vane section 220 extends in a small-width shape to a certain length within a circumferential range of 360 degrees in a plan view; the length being set to be a length with which the flat surfaces 230 of any adjoining circular-arc vane sections 220 arranged on the same circumference in a plan view will not be overlapped upon each other in a circumferential direction in any portion from one end part 220*a* thereof to the other end part. 220*b* thereof. In the present embodiment, any circular-arc vane section 220 has a length covering an angle range of approx. 60 degrees in a plan view, the length being ⅔ or so of the length of the circular-arc vane section 22. The number of the circular-arc vane sections 22, 220 is not limited to 3 as mentioned above, and may be adapted to be two or four or more. The specific value of the length or lateral width of each circular-arc vane section 22, 220 is also a design matter which can be appropriately determined.

Further, one end part 22*a* of each circular-arc vane section 22 of the rotating vane assembly 21 at the lowest stage is connected to the distal end of a radial spoke 24, which is fixed to the rotating axle 20 in a radial manner. Here, three radial spokes 24 are provided in accordance with the number of circular-arc vane sections 22, each of the radial spokes 24 being disposed so as to be developed on a plane orthogonal to the axial direction of the rotating axle 20, supporting the circular-arc vane section 22 which is relevant.

In the present embodiment, the circular-arc vane section 22 and the radial spoke 24 are those which have been integrally formed, being configured by cutting a single metal plate and bending it. In other words, the radial spoke 24 is plate-like, extending in a fixed width as with the circular-arc vane section 22, providing a member which linearly extends from the rotating axle 20 in a radial direction. To the distal end of this radial spoke 24, one end part 22*a* of the circular-arc vane section 22 which is relevant is integrally continued.

More particularly, the radial spoke 24 is bent so as to be obliquely inclined in a crosswise direction in accordance with the inclination of the flat surface 23 of the circular-arc vane section 22, being inclined at a prescribed angle with respect to the bottom plate 15 of the drying vessel 11 as shown in FIG. 4. Thereby, the radial spoke 24 serves to positively scrape the material to be dried which is staying on the bottom plate 15. Further, in the radial spoke 24, a side edge 24*a*, which is directed toward the rotating direction R, is formed as a tapered edge, being disposed to oppose the bottom plate 15.

Figure 5:
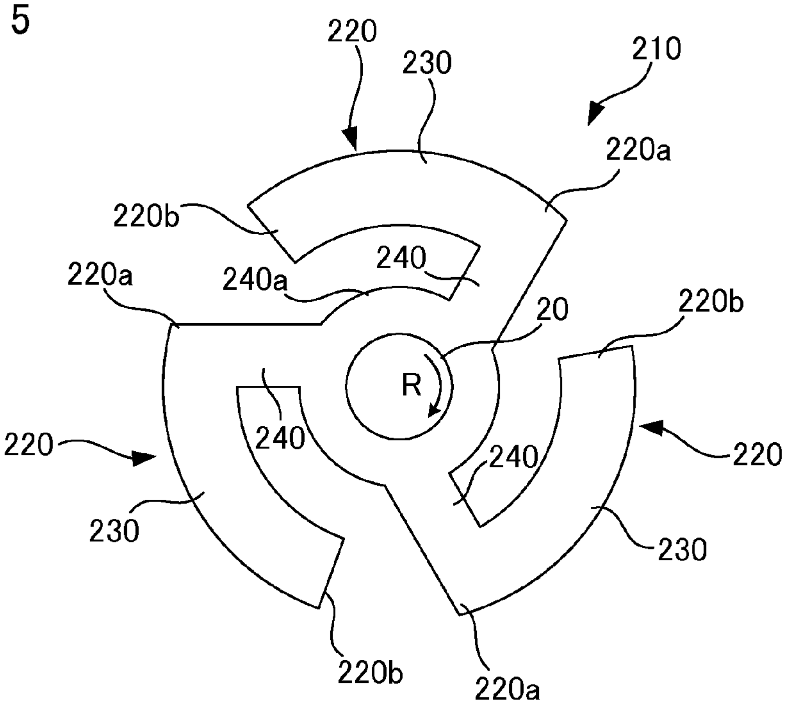
FIG. 5 is a plan view showing circular-arc vane sections constituting the rotating vane assembly at a particular stage other than the lowest stage that are provided in the drying apparatus according to the first embodiment of the present invention.
Figure 6:
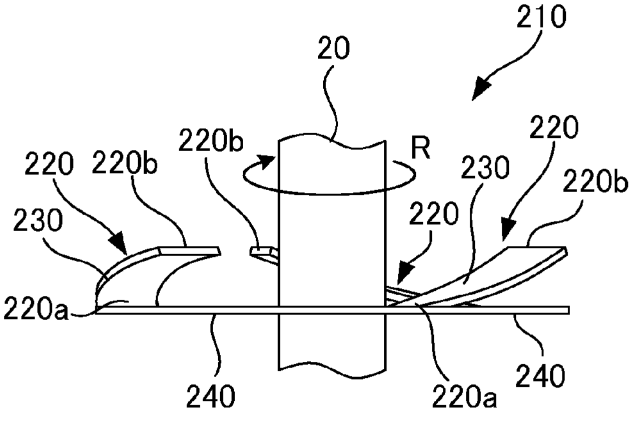
FIG. 6 is a side view showing circular-arc vane sections constituting the rotating vane assembly at a particular stage other than the lowest stage that are provided in the drying apparatus according to the first embodiment of the present invention.

Further, as shown in FIG. 5 and FIG. 6, each circular-arc vane section 220 of the rotating vane assembly 210 at the stages other than the lowest stage is connected to the distal end of a radial spoke 240, which extends in a radial manner from the outer periphery of a small disc portion 240*a*. The rotating axle 20 is passed through the small disc portion 240*a*, in which a circular through-hole is formed for fixing it to the rotating axle 20. As is the case with the radial spoke 24, three radial spokes 240 are provided in accordance with the number of circular-arc vane sections 220, each of the radial spokes 240 being disposed so as to be developed on a plane orthogonal to the axial direction of the rotating axle 20, with the distal end thereof being integrally connected to one end part 220*a* of the circular-arc vane section 220 which is relevant.

Here, the radial spoke 240 and the circular-arc vane section 220 are also that which have been integrally formed, being configured by cutting a single metal plate and bending it. However, unlike the radial spoke 24, as shown in FIG. 6, there is not particularly provided an inclination in a crosswise direction. In other words, each radial spokes 240 is disposed such that it is entirely along a plane orthogonal to the axial direction of the rotating axle 20. Accordingly, the radial spoke 240 in the rotating vane assembly 210 at the stages other than the lowest stage will not particularly serve to positively scrape the material to be dried.

Further, although the illustration is not given, it is recommended that the other end part 22*b*, 220*b* of each of the circular-arc vane sections 22, 220 be also connected to the distal end of a support arm fixed to the rotating axle 20 in a radial manner. Here, the support arm particularly need not serve for scraping as with the radial spoke 24, and may be designed in any way, provided that it has a design which simply provides supporting and reinforcing, however, it is recommended that the support arm be configured to be the smallest possible like a small bar, or the like, so as not to interfere with the operation of raising the material to be dried.

As shown in FIG. 1, with the rotating vane assemblies 21, 210 forming a plurality of stages, the rotating vane assembly 21 at the lowest stage, which is described above, is disposed in the lower portion of the rotating axle 20, and thereabove, the other rotating vane assemblies 210 are disposed so as to be arranged in a four-stage form with an equal spacing, thus a multi-stage configuration being provided. In the present embodiment, the rotating vane assemblies 210 have been provided in a four-stage form, however, such rotating vane assemblies 210 may be disposed in a single-, two-, three-, or five- or more-than-five stage form in accordance with the level or dimensions of the drying vessel 11.

Regardless of the number of stages, the clearance F between any two adjoining stages is important. As this clearance F, it is specified on the basis of the above-described consideration that the dimension from the uppermost end of the other end part 22*b*, 220*b* of each circular-arc vane section 22, 220 of a particular rotating vane assembly 21, 210 to the lowermost end of one end part 220*a* of each circular-arc vane section 220 of the rotating vane assembly 210 provided one stage thereabove is 0 to 15% of the diameter of a circle connecting between the adjacent outermost peripheral edges of the flat surfaces 23, 230 of the circular-arc vane sections 22, 220 (hereinafter, to be simply referred to as the diameter). Further, it has been confirmed that, if the above-mentioned dimension is in the range of 0 to 9%, a more excellent effect can be expected.

Here, the clearance F between any two adjoining stages need not be uniformly identical, provided that it is in the range of 0 to 15% of the diameter of the circular-arc vane sections 22, 220. For example, as shown in FIG. 1, the clearance F between the rotating vane assembly 21 at the lowest stage and the rotating vane assembly 210 at a second stage just thereabove may be set to be smaller than that between any two adjoining ones of the rotating vane assemblies 210 at a second stage and the stages thereabove. The diameter of the circular-arc vane sections 22 at the lowest stage and the diameter of the circular-arc vane sections 220 at any stage other than that are the same in consideration of the clearance U from the heat-transmitting face 12 (refer to FIG. 10)

As a specific value of the clearance F between any two adjoining stages, if the diameter is 2000 mm, for example, it is set in the range of 0 to 300 mm. Here, the diameter varies depending upon a specific inner diameter of the drying vessel 11, and in accordance with such inner diameter of the drying vessel 11, the diameter and the clearance F between any two adjoining stages are specifically set. Further, at what value in the range of 0 to 300 mm the clearance F between any two adjoining stages is to be set will be appropriately determined, depending upon the type of the material to be dried.

For example, in the case where the material to be dried is dewatered sludge from a sewage treatment plant, the water content is 80 to 85%, and when the evaporation of the water in the material to be dried is progressed to a water content of 65 to 70%, the viscosity is greatly increased, resulting in a part of the material to be dried becoming massive. According to such a characteristic, if the clearance F between any two adjoining stages is particularly set at a value in the range of 100 to 180 mm, which is within the range of 0 to 300 mm, a stable high drying efficiency can be achieved. Such a numerical value will vary depending upon the inner diameter of the drying vessel 11, and for example, in the case where the diameter is 1000 mm, the clearance F between any two adjoining stages will be appropriately set in the range of 50 to 9.0 mm.

In the case where the material to be dried is sludge from a sewage treatment plant, being not yet dewatered, the water content is 95 to 98%, which means that the material to be dried is in the liquid state, and thus even when the evaporation of the water in the material to be dried is progressed to a water content of 65 to 70%, as with the case described above, the volume of a solid substance is extremely low. According to such a characteristic, if the clearance F between any two adjoining stages is set at a value in the range of 30 to 120 mm, which is still narrower within the range of 0 to 300 mm, the efficiency of contacting with the jacket 13 can be enhanced even when the viscosity is high. Further, in the case where the diameter is 1000 mm, the clearance F between any two adjoining stages will be appropriately set in the range of 15 to 60 mm. The clearance F between any two adjoining stages for other types of material to be dried will be described later, however, in any case, it will be specifically set in the range of 0 to 15% of the diameter.

The critical significance of the numerical limitation of that the clearance F between any two adjoining stages should be in the range of 0 to 15% of the diameter is as described above (refer to par. 0021 to 0023). In other words, by setting the clearance F between any two adjoining stages at a value in such a range, it is made possible that, at every stage from the rotating vane assembly 21 at the lowest stage to the rotating vane assembly 210 at the highest stage, the material to be dried is pressed against the jacket 13, i.e., the heat-transmitting face 12 in a uniform thin film state, and also raised in an optimum time in sequence.

In the case where the clearance F between any two adjoining stages is under 0% of the diameter, in other words, even a part of the circular-arc vane section 22, 220 at a particular stage is overlapped upon that at an adjoining stage in a vertical direction, unnecessary turbulences are generated, mutually interfere with one another, thereby the raising action being diminished. On the other hand, if the clearance F between any two adjoining stages is increased to over 15% of the diameter, the material to be dried will not be successfully transferred upward at each stage, regardless of the type of material to be dried, thereby the climbing being stopped in the middle, which has been confirmed through a number of experiments conducted by the inventor et al. The lower limit of the clearance F between any two adjoining stages is as described above, and in addition to this, it has been confirmed that there is an optimum value according to an actual material to be dried, which is a numerical value over 0% of the diameter.

Figure 7:
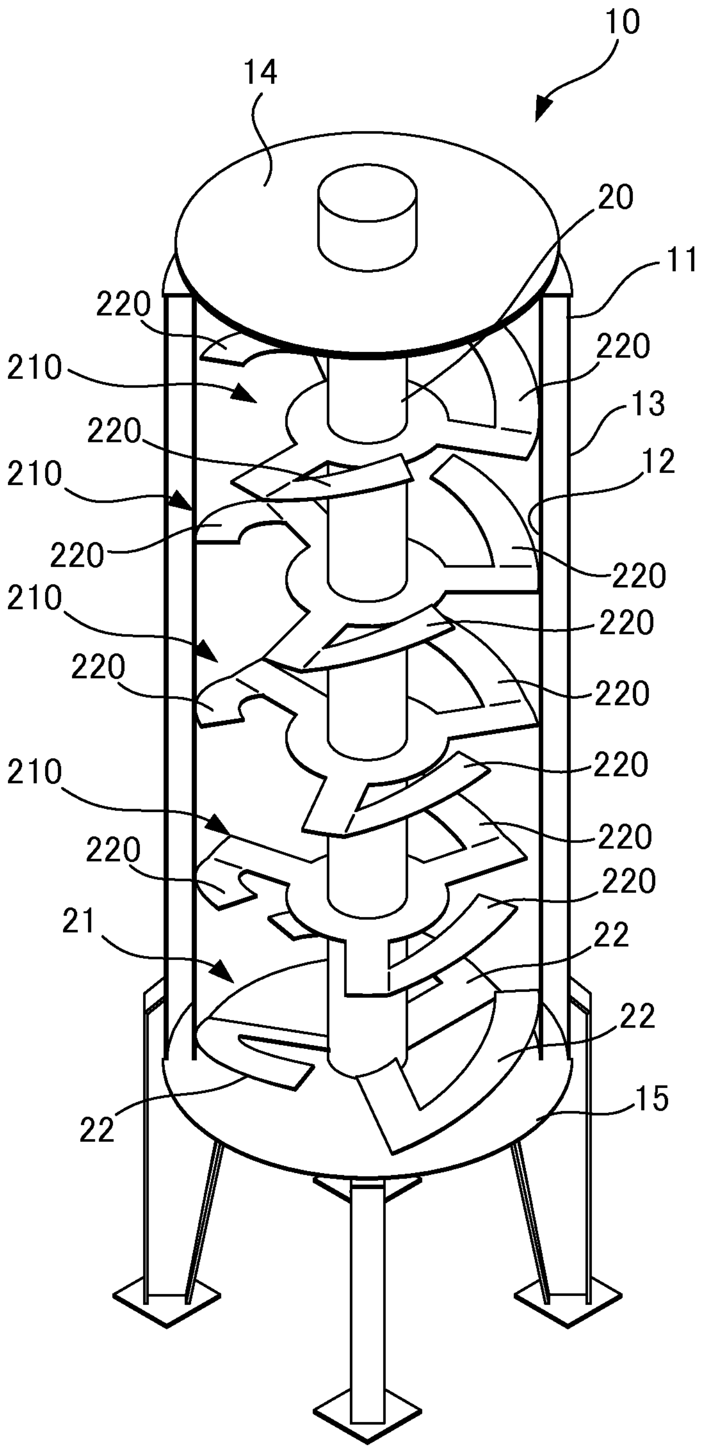
FIG. 7 is a partially sectional perspective view showing the drying apparatus according to the first embodiment of the present invention.

Furthermore, the relative arrangement of the circular-arc vane sections 22, 220 at any two adjoining stages is as important as the clearance F between any two adjoining stages. Also about such an arrangement, the inventor et al. have carried out intensive studies, and have found that, by adopting the following special way of arrangement, an extremely high drying efficiency can be realized. Specifically, as shown in FIG. 7, the rotating vane assemblies 21, 210 forming a plurality of stages are disposed in such a manner that they are arranged in the form of a multiple spiral staircase along the rotating axle 20, the respective circular-arc vane sections 22, 220 at any two adjoining stages being shifted in angular position by a prescribed angle in a plan view, extending in a direction reverse to the rotating direction R.

Figure 8:
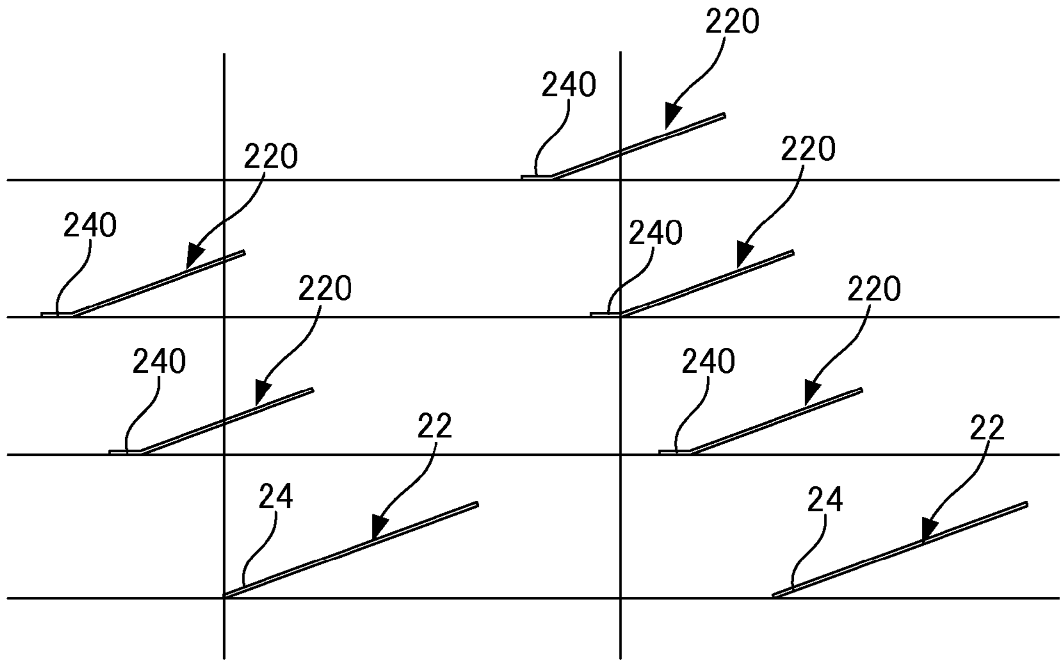
FIG. 8 is a development diagram showing a part of the arrangement of the circular-arc vane sections constituting the rotating vane assembly at the respective stages that are provided in the drying apparatus according to the first embodiment of the present invention.

More specifically, as shown in FIG. 8, the angular position shift between the circular-arc vane section 22 of the rotating vane assembly 21 at the lowest stage, and the circular-arc vane section 220 of the rotating vane assembly 210 at the stage one-stage thereabove, in other words, at a second stage from the bottom is set by shifting one end part 220*a* of the circular-arc vane section 220 located the closest to the other end part 22*b* of a particular circular-arc vane section 22 in a direction reverse to the rotating direction R toward the reverse direction so as for such end parts not to overlap one upon another in a plan view in such a manner that the one end part 220*a* of the circular-arc vane section 220 is located beneath an inclined plane formed by extending the flat surface 23 at the other end part 22*b* of the circular-arc vane section 22.

Further, with the rotating vane assemblies 210 at the second and subsequent stages, the respective circular-arc vane sections 220 have the same geometry, and the circular-arc vane sections 220 at any two adjoining stages are disposed in the same manner as described above, one end part 220*a* of the upper circular-arc vane section 220 located the closest to the other end part 220*b* of a particular lower circular-arc vane section 220 in a direction reverse to the rotating direction R being shifted toward the reverse direction by a prescribed angle (a distance B in FIG. 9) so as for such end parts not to overlap one upon another in a plan view in such a manner that the one end part 220*a* of the upper circular-arc vane section 220 is located beneath an inclined plane formed by extending the flat surface 230 at the other end part 220*b* of the lower circular-arc vane section 220.

Figure 9:
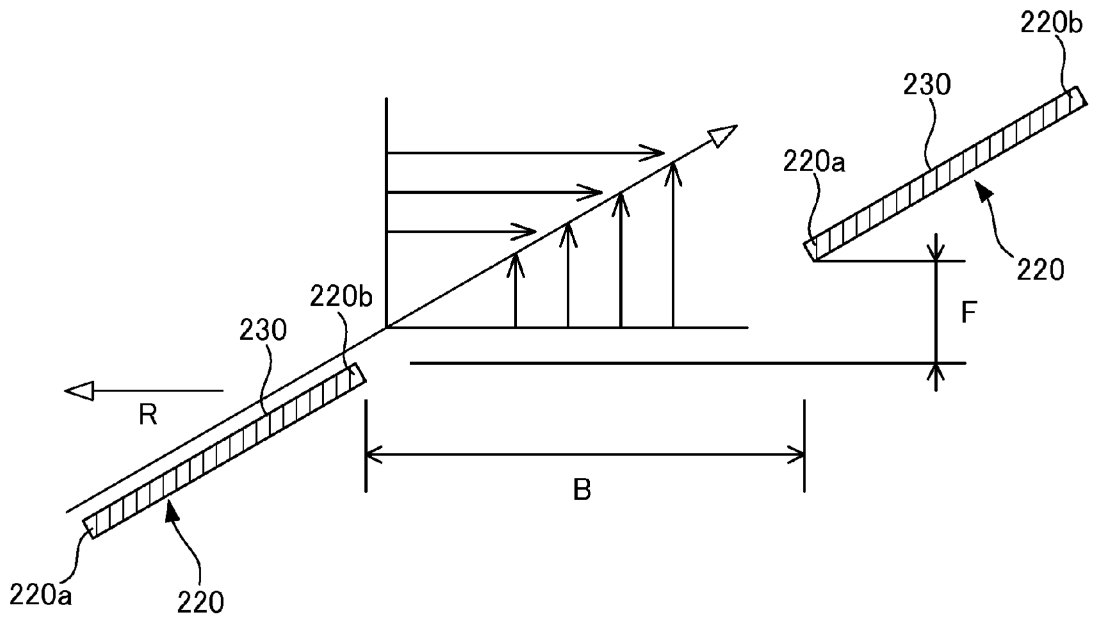
FIG. 9 is an explanatory drawing illustrating the function of the drying apparatus according to the first embodiment of the present invention at the time of using thereof.

According to such an arrangement, as shown in FIG. 9, with the above-described clearance F between any two adjoining stages, the material to be dried which has been raised by the circular-arc vane section 220 at a particular lower stage will be scooped up at a good timing by one end part 220*a* of the circular-arc vane section 220 at the upper stage just thereabove that is located the closest thereto in a direction reverse to the rotating direction R, and then moved obliquely upward without being pressed by the bottom face of the one end part 220*a* of the rotating circular-arc vane section 220 at the upper stage just thereabove that is located the closest thereto in a direction reverse to the rotating direction R, thus the material to be dried being moved in sequence in such a manner that it climbs a multiple spiral staircase formed by the respective circular-arc vane sections 22, 220.

Further, in the present embodiment, above the rotating vane assembly 210 at the highest stage, there is disposed a receiving plate 30, which is provided on the inner wall of the drying vessel 11 for receiving the material to be dried which is moved to above the rotating vane assembly 210 at the highest stage, and causing it to be dropped down through the inside of the respective rotating vane assemblies 210. The receiving plate 30 is formed of a plate-like member a face of which vertically extends in a small width shape is disposed so as to be faced opposite to the rotating direction R of the rotating vane assembly 210, two or more receiving plates 30 being arranged with an equal spacing in a circumferential direction. In the present embodiment, there are provided with three receiving plates 30, however, the specific geometry and arrangement of such receiving plate 30 are design matters which can be appropriately determined; it is recommended to provide at least two receiving plates 30, and in accordance with the inner diameter of the drying vessel 11, for example, as the inner diameter is increased, the number of receiving plates 30 is increased.

Next, the function of the drying apparatus 10 according to the first embodiment will be explained.

From the supply opening provided in the top cover 14 of the drying vessel 11, the material to be dried is charged into the drying vessel 11. Then, the electric motor 18 is driven to rotate the rotating axle 20 in the direction of R. At the same time, steam is introduced into the jacket 13 from the boiler for heating the heat-transmitting face 12. With the revolution of the rotating axle 20, the rotating vane assemblies 21, 210 are rotated, the material to be dried is put on the flat surface 23, 230 from one end part 22*a*, 220*a* of each of the respective circular-arc vane sections 22, 220, being moved toward the other end part 22*b*, 220*b* thereof.

Figure 10:
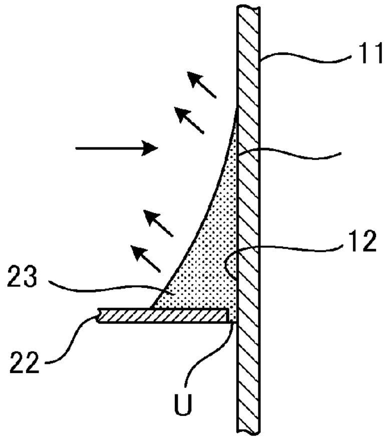
FIG. 10 is an explanatory drawing illustrating the state of the material to be dried at the time of using the drying apparatus according to the first embodiment of the present invention.

At this time, the material to be dried is subjected to an upward directing force, being raised, and is pressed against the heat-transmitting face 12 by the centrifugal force P (refer to FIGS. 9 and 10). The flat surface 23, 230 of each circular-arc vane section 22, 220, which provides such a raising action and a pressing action, extends in an elongated shape along the heat-transmitting face 12, and the outer peripheral edge thereof is in a circular arc shape which holds a clearance U from the heat-transmitting face 12. Therefore, the material to be dried is not subjected to an impact alone, but effectively being raised and pressed against the heat-transmitting face 12.

In addition, the material to be dried is not raised by a single continuous blade in the drying vessel 11, but is raised in sequence by the respective circular-arc vane sections 22, 220, while being pressed against the heat-transmitting face 12. Therefore, even if the material to be dried has a high viscosity, it will not adhere to the heat-transmitting face 12, and also not stay in a specific place on the heat-transmitting face 12. Further, since the respective circular-arc vane sections 22, 220 have a certain length within a circumferential range of 360 degrees in a plan view, being mutually independent, the clearance U between the outer peripheral edge of the flat surface 23, 230 of the respective circular-arc vane sections 22, 220 and the heat-transmitting face 12 is not contiguous, and therefore, even if a foreign matter in the material to be dried is bitten in the clearance U, it will immediately get out of the clearance U, the biting being not continued.

Particularly, each circular-arc vane section. 22 of the rotating vane assembly 21 at the lowest stage has a long dimension, compared to each circular-arc vane section 220 at the other stages, thereby being Able to apply a still greater raising force to the material to be dried, which tends to stay in the bottom portion of the drying vessel 11 at the beginning. Thus, the material to be dried can be smoothly moved from the bottom portion of the drying vessel 11 to the respective upper stages. Further, the radial spoke 24, which supports the relevant circular-arc vane section 22 at the lowest stage, is inclined with respect to the bottom plate 15 as shown in FIG. 4, whereby the material to be dried staying on the bottom plate 15 can be positively scooped up not only with the circular-arc vane section 22, but also with the radial spoke 24. Thus, the material to be dried can be earlier contacted with the heat-transmitting face 12.

Further, there are provided the rotating vane assemblies 21, 210 in a plurality of stages in a vertical direction, and thus the material to be dried is raised at every stage, while being pressed against the heat-transmitting face 12 in a thin film state, in such a manner that the material to be dried which has been previously raised is raised to the stage one-stage above, being pushed up by the material to be dried which is subsequently raised. Thus, from the rotating vane assembly 21 at the lowest stage to the rotating vane assembly 210 at the highest stage, the material to be dried can be continuously dried, while being raised in sequence, thereby the entire face of the heat-transmitting face 12 provided for the inner wall of the drying vessel 11 in a vertical direction thereof is effectively utilized, and thus an extremely high drying efficiency on the basis of the advantage of the vertical type can be reliably implemented.

As shown in FIG. 10, the material to be dried which has been pressed against the heat-transmitting face 12 in a thin film state at a particular stage provides a face which is in contact with the heat-transmitting face 12 on one side, while, on the other side, providing an evaporation face which is contacted with the air in the spacing in the drying vessel 11. With the material to be dried which has been contacted with the heat-transmitting face 12, a certain degree of moisture evaporation is caused at that place due to the heat transmitted from the heat-transmitting face 12. The material to be dried the water content of which has been reduced resulting from the moisture evaporation at the time of contact with the heat-transmitting face 12 is moved to the evaporation face in such a manner that it replaced with a material to be dried which is high in water content.

The material to be dried which has been moved to the evaporation face is exposed to the air, resulting in the moisture evaporation being further progressed. Further, at the same time when the material to be dried is moved from the heat-transmitting face 12 to the evaporation face, the material to be dried is raised along the heat-transmitting face 12 in such a manner that, as a result of the raising action of each circular-arc vane section 22, 220, the material to be dried which has been previously raised is intermittently pushed up by the material to be dried which is subsequently raised. In other words, the material to be dried is moved from the heat-transmitting face 12 to the evaporation face, while being raised along the heat-transmitting face 12, thus being dried while climbing. Such a drying process is repeated at each stage in sequence.

Here as described above, the clearance F between any two adjoining stages of the stages of the rotating vane assembly 21, 210 becomes important. By setting the value of such clearance F at 0 to 15% of the diameter of the rotating vane assembly 21, 210, it is made possible that, at every stage from the rotating vane assembly 21 at the lowest stage to the rotating vane assembly 210 at the highest stage, the material to be dried is pressed against the heat-transmitting face 12 in a uniform thin film state, and also raised in an optimum time in sequence. It is recommended that the value of the clearance F between any two adjoining stages of the stages of the rotating vane assembly 21, 210 be appropriately set in such a range in accordance with the specific type of material to be dried.

Specifically, for example, kitchen garbage, such as cooking residues, and expired foods, contain scraps of vegetables at a very high percentage, having much fibers as a whole, thereby being poor in stickiness. With the drying apparatus 10 adapted for mainly handling of materials to be dried having such a characteristic, the value of the clearance F between any two adjoining stages of the stages of the rotating vane assembly 21, 210 is varied depending upon the inner diameter of the drying vessel 11, however, the value of the same is set at 0 to 15% of the diameter of the circular-arc vane sections 22, 220 in accordance with the inner diameter, namely, approx. 20 to 120 mm. Thereby, the kitchen garbage as the material to be dried can be maintained in a good state for drying, being contacted with the entire face of the heat-transmitting face 12 provided along a vertical direction of the inner wall of the drying vessel 11.

Further, in the case where a perishable, such as fish or a shellfish, is handled, the perishable loses its viscosity as the drying is progressed, being brought into a dried-out state, thereby the perishable tends to be changed into an extremely thin film with respect to the heat-transmitting face 12. With the drying apparatus 10 adapted for mainly handling of materials to be dried having such a characteristic, the value of the clearance F between any two adjoining stages of the stages of the rotating vane assembly 21, 210 is varied depending upon the inner diameter of the drying vessel 11, however, the value of the same is set at approx. 50 to 200 nm. Thereby, the perishable as the material to be dried can be maintained in a good state for drying, being contacted with the entire face of the heat-transmitting face 12 provided along a vertical direction of the inner wall of the drying vessel 11.

Further, in the case where waste liquid is handled, the waste liquid has a high water content, while having an extremely small amount of solid substances. With the drying apparatus 10 adapted for mainly handling of materials to be dried having such a characteristic, the value of the clearance F between any two adjoining stages of the stages of the rotating vane assembly 21, 210 is varied depending upon the inner diameter of the drying vessel 11, however, the value of the same is set at approx. 100 to 250 mm. Thereby, along the entire face of the heat-transmitting face 12 of the drying vessel 11, the material to be dried can be efficiently raised, and can be reliably contacted with the entire face of the heat-transmitting face 12.

Further, in the case where a fruit is handled, the fruit has a relatively high water content, and a large amount of sugar, and therefore, as the moisture therein is evaporated and the ratio of the solid content is increased, the adhesion rate the fruit is increased. Due to such a characteristic, the fruit tends to be easily raised to the upper portion in a vertical direction of the inner wall of the drying vessel 11, thereby a spacing being produced in the lower portion or the intermediate portion thereof, and being poor in contact, and difficult to be uniformly changed into a thin film, however, by setting the value of the clearance F at 80 to 150 mm, the material to be dried can be reliably pressed, in a thin film state, against the entire face of the heat-transmitting face 12 provided along a vertical direction of the inner wall of the drying vessel 11.

Further, in the case where a food containing a lot of carbohydrate, such as rice, udon (wheat noodle), or soba (buckwheat noodle), is handled, the food has a low water content, however, heating it will change its state into a state like a softened rice cake, the stickiness thereof being extremely increased. It has been the that such a food containing a lot of carbohydrate cannot be dried with a conventional drying apparatus, however, with the present drying apparatus 10, by setting the value of the clearance F at 0 to 80 mm, the food containing a lot of carbohydrate as the material to be dried can be maintained in a good state for drying, being contacted with the entire face of the heat-transmitting face 12 provided along a vertical direction of the inner wall of the drying vessel 11.

Further, the internal organs of a squid have an extremely high water content, a high fat content, and a low solid content, and when the evaporation is progressed, resulting in the moisture having been removed, the squid internal organs are brought into a mushy slurry state due to the fat contained. With the drying apparatus 10 adapted for mainly handling of materials to be dried having such a characteristic, by setting the value of the clearance F at 30 to 150 mm, the material to be dried can be reliably pressed, in a thin film state, against the entire face of the heat-transmitting face 12 provided along a vertical direction of the inner wall of the drying vessel 11, whereby a dried substance having a good quality can be produced.

Further, in the case where a residue of an animal food, or minced meat of a butchered animal, or the like, is dried, such a substance has a lot of fat, and therefore if the moisture is evaporated, is changed into a mixture of a solid content and a lot of fat. With the drying apparatus 10 adapted for mainly handling of materials to be dried having such a characteristic, by setting the value of the clearance F at 80 to 180 mm, the material to be dried can be maintained in a good state for drying, being contacted with the entire face of the heat-transmitting face 12 provided along a vertical direction of the inner wall of the drying vessel 11.

Furthermore, in the case where a green tea extraction residue, or the like, is dried, it is in the dewatered state, thereby having a low water content and exhibiting no viscosity, and therefore, by setting the value of the clearance F at 0 to 60 mm, the material to be dried can be efficiently raised in a vertical direction, being reliably contacted with the entire face of the heat-transmitting face 12. As another example, in the case where a material to be dried which has a water content as low as 30 to 50%, such as powder, is dried, it has a low viscosity, and therefore, by setting the value of the clearance F at 0 to 30 mm, the material to be dried can be efficiently raised in a vertical direction, being reliably contacted with the entire face of the heat-transmitting face 12.

For any of the above-described great variety of materials to be dried, if the value of the clearance F is not in the range of 0 to 15% of the diameter of the circular-arc vane sections. 22, 220, the efficiency of climbing in a vertical direction is low, the efficiency of contacting with the heat-transmitting face 12 being deteriorated, thereby the drying time required, which is one of the important performance characteristics of the drying apparatus 10, being extremely increased. Particularly, that the efficiency of climbing in a vertical direction is low means that it is impossible to utilize the advantage of the vertical type of being capable of employing the entire face of the heat-transmitting face 12 provided along a vertical direction of the inner wall of the drying vessel 11. Accordingly, the value of the clearance F between any two adjoining stages of the stages of the rotating vane assembly 21, 210 is important.

Further, as important as the value of the clearance F is the relative arrangement of the circular-arc vane sections 22, 220 between any two adjoining stages of the stages of the rotating vane assembly 21, 210. With such an arrangement, as shown in FIG. 7 and FIG. 8, the circular-arc vane sections 22, 220 at any two adjoining stages are shifted in angular position by a prescribed angle in a plan view, extending in a direction reverse to the rotating direction. R, thereby the rotating vane assemblies 21, 210 forming a plurality of stages being disposed in such a manner that they are arranged in the form of a multiple (triple in the present embodiment) spiral staircase.

With such a special arrangement, the material to be dried which has been first scooped up from the bottom portion of the drying vessel 11 by the circular-arc vane section 22 and radial spoke 24 at the lowest stage is then scooped up by one end part 220*a* of the circular-arc vane section 220 at a second stage that is located the closest thereto in a direction reverse to the rotating direction R, while being pressed against the heat-transmitting face 12 in a thin film state by the centrifugal force. Then, the material to be dried which has been raised by the circular-arc vane section 220 at a second stage is scooped up by one end part 220*a* of the circular-arc vane section 220 at a third stage that is located the closest thereto in a direction reverse to the rotating direction R, while being pressed against the heat-transmitting face 12 in a thin film state in the same manner.

In other words, the material to be dried which has been charged into the drying vessel 11 is dried, while being moved in sequence from the rotating vane assembly 21 at the lowest stage toward the rotating vane assembly 210 at the highest stage in such a manner that the material to be dried climbs a multiple spiral staircase in which the respective circular-arc vane sections 22, 220 are intermittently continued. Further, the material to be dried can be replenished with a climbing force and a centrifugal force through the revolution of the rotating vane assembly 210 at the second and subsequent stages. In this way, the present invention allows effective utilization of the entire face of the heat-transmitting face 12 provided along a vertical direction of the inner wall of the drying vessel 11, whereby an extremely high drying efficiency on the basis of the advantage of the vertical type can be reliably implemented.

Particularly, each circular-arc vane section 22 of the rotating vane assembly 21 at the lowest stage is formed long, compared to each circular-arc vane section 220 at the other stages, and this each circular-arc vane section 22 at the lowest stage is disposed such that the other end part 22*b* thereof is located higher than one end part 22*a* of the other circular-arc vane section 22 which is adjacent thereto in a direction reverse to the rotating direction R, being overlapped thereupon in a plan view. Thus, a still greater raising force can be applied to the material to be dried, which tends to stay in the bottom portion of the drying vessel 11 at the beginning, whereby the material to be dried can be smoothly moved from the bottom portion of the drying vessel 11 to the respective upper stages. Further, in the present embodiment, the radial spoke 24 serves to positively scrape the material to be dried which is staying on the bottom plate 15.

Further, as shown in FIG. 9, the circular-arc vane sections 220 at any two adjoining stages are disposed in such a manner that one end part 220*a* of the upper circular-arc vane section 220 located the closest to the other end part 220*b* of a particular lower circular-arc vane section 220 in a direction reverse to the rotating direction R is shifted toward the reverse direction by a prescribed angle so as for such end parts not to overlap one upon another in a plan view, and is located beneath an inclined plane formed by extending the flat surface 230 at the other end part 220*b* of the lower circular-arc vane section 220. Thereby, the material to be dried which is raised by the circular-arc vane section 220 at a particular stage, and is moved obliquely upward along the heat-transmitting face 12 can be reliably transferred to one end part 220*a* of the circular-arc vane section 220 at the stage just thereabove.

Further, each circular-arc vane section 220 at the second and subsequent stages has a certain length extending in a circular arc shape in the range of a prescribed angle around the rotating axle 20, and the flat surfaces 230 of the circular-arc vane sections 220 which adjoin each other in a plan view within a circumferential range of 360 degrees can be easily disposed such that they are shifted in angular position from each other by a prescribed angle so as not to be overlapped upon each other in a circumferential direction. One end part 22*a*, 220*a* of each circular-arc vane section 22, 220 is connected to the distal end of the radial spoke 24, 240 which is relevant, being fixed to the rotating axle 20 in a radial manner, however, if there is provided a configuration in which the other end part 22*b*, 220*b* thereof is also connected to the distal end of a support arm fixed to the rotating axle 20 in a radial manner, a sufficient supporting strength can be also obtained.

In FIG. 1, the material to be dried which is moved to above the rotating vane assembly 210 at the highest stage is received by the receiving plate 30 provided on the inner wall of the drying vessel 11, thereby being prevented from taking its natural climbing course, and being caused to be dropped down through the inside of the respective rotating vane assemblies 210. Thereby, the process of drying the material to be dried is again performed from the rotating vane assembly 21 at the lowest stage, whereby the drying efficiency can be further enhanced. The material which has been dried can be taken out to the outside from the discharging port provided in the vicinity of the bottom plate 15 of the drying vessel 11 after the drive of the electric motor 18 having been stopped.

Next, a second embodiment will be explained with reference to FIG. 11. With a drying apparatus 10A according to the present embodiment, there is provided a rotating vane assembly 21 at the lowest stage configured in the same manner as that in the first embodiment in the lower portion of the rotating axle 20, and thereabove, there are provided the other rotating vane assemblies 210 in a four-stage form in total that are configured in the same manner as in the first embodiment. The number of stages provided in a vertical direction may be six or more in total, depending upon the height or the dimensions of the drying vessel 11, and it is a design matter which can be appropriately altered.

The clearance F between any two adjoining stages of the stages of the rotating vane assembly 21, 210 and the relative arrangement of the circular-arc vane sections 22, 220 between any two adjoining stages are the same as those in the first embodiment, and thus a duplicated explanation will be omitted. In the present embodiment, there is provided a configuration in which a feed tube 16 is connected to a wall surface in the vicinity of the drying vessel 11 for supplying the material to be dried to the bottom portion of the drying vessel 11 by means of a feed screw 16*a*, while, by connecting a delivery tube 17 to a wall surface in the vicinity of the top cover 14 of the heat-transmitting face 12 for discharging the material which has been dried to the outside by means of a delivery screw 17*a*.

With such a drying apparatus 10A, batch type processing, in which the supply of the material to be dried is divided for intermittently obtaining the material which has been dried, may be performed, or continuous type processing, in which the material to be dried is continuously supplied, and the material which has been dried is continuously discharged may also be adopted. In the present embodiment, it is presupposed that the continuous type processing is also performed, and thus the receiving plate 30 is omitted.

Figure 12:
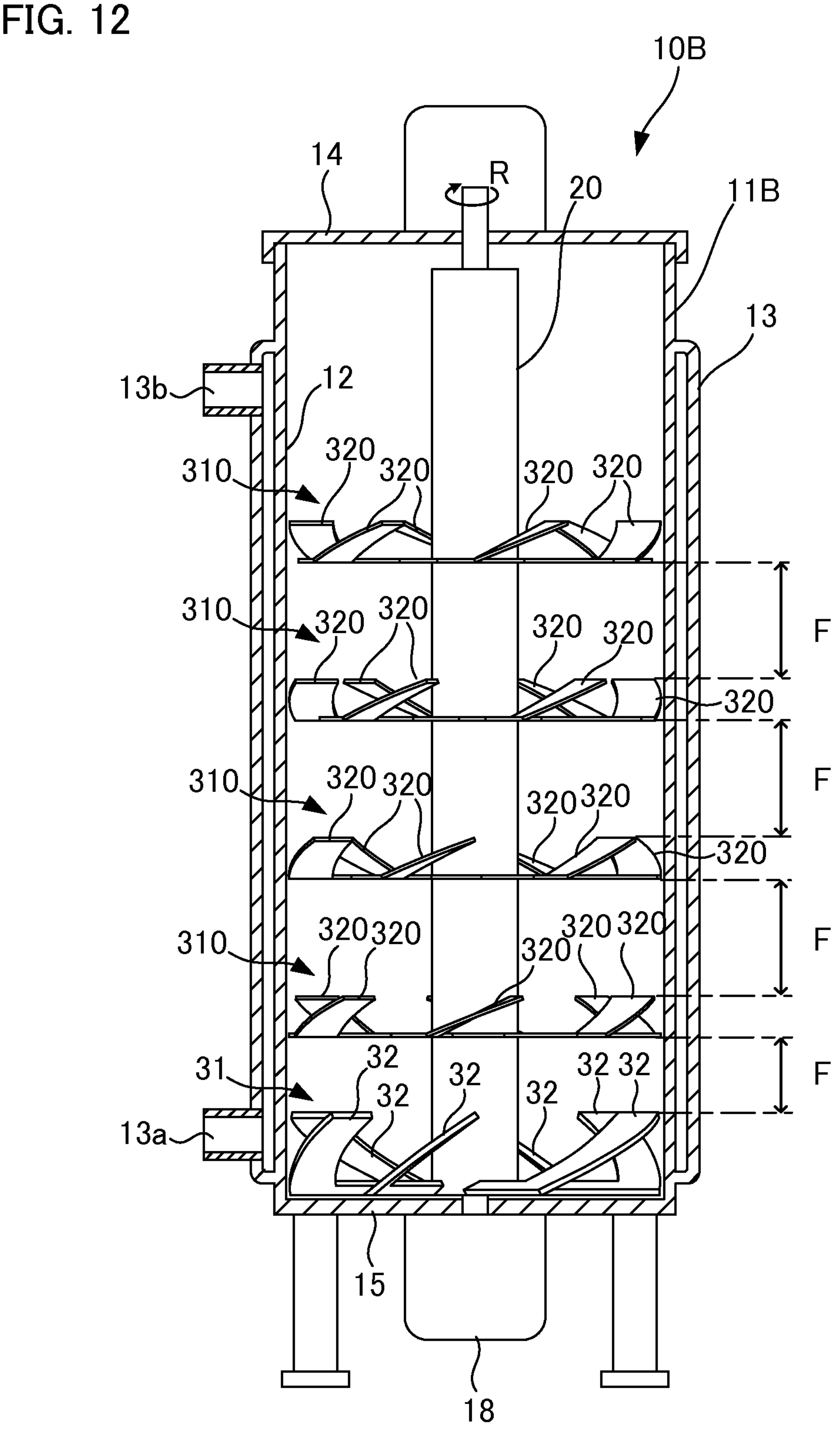
FIG. 12 is a vertical sectional view showing the internal construction of a drying apparatus according to a third embodiment of the present invention.

Next, a third embodiment will be explained with reference to FIG. 12 to FIG. 18. As shown in FIG. 12, a drying apparatus 10B according to the present embodiment has a multi-stage configuration in which, in the lower portion of the rotating axle 20, there is provided a rotating vane assembly 31 at the lowest stage that is different in configuration from the first embodiment, and thereabove, a rotating vane assembly 310 which has a further different configuration is provided in a four-stage form. The other components, such as a drying vessel 11, a heat-transmitting face 12, and a jacket 13 are the same as those in the first embodiment, and the same portions as those in the first embodiment are provided with the same symbols with a duplicated explanation being omitted.

The rotating vane assemblies 31, 310 are comprised of a plurality of circular-arc vane sections 32, 320, respectively, which are arranged in a circumferential direction around the rotating axle 20, and in the present embodiment, the rotating vane assemblies 31, 310 include six circular-arc vane sections 32, 320, respectively. The rotating vane assembly 31 at the lowest stage and the rotating vane assembly 310 at the other stages are different from each other in length of the circular-arc vane sections 32, 320, respectively. In other words, the circular-arc vane section 32 of the rotating vane assembly 31 at the lowest stage is formed longer than the circular-arc vane section 320 of the rotating vane assembly 310 of the other stages.

Figure 13:
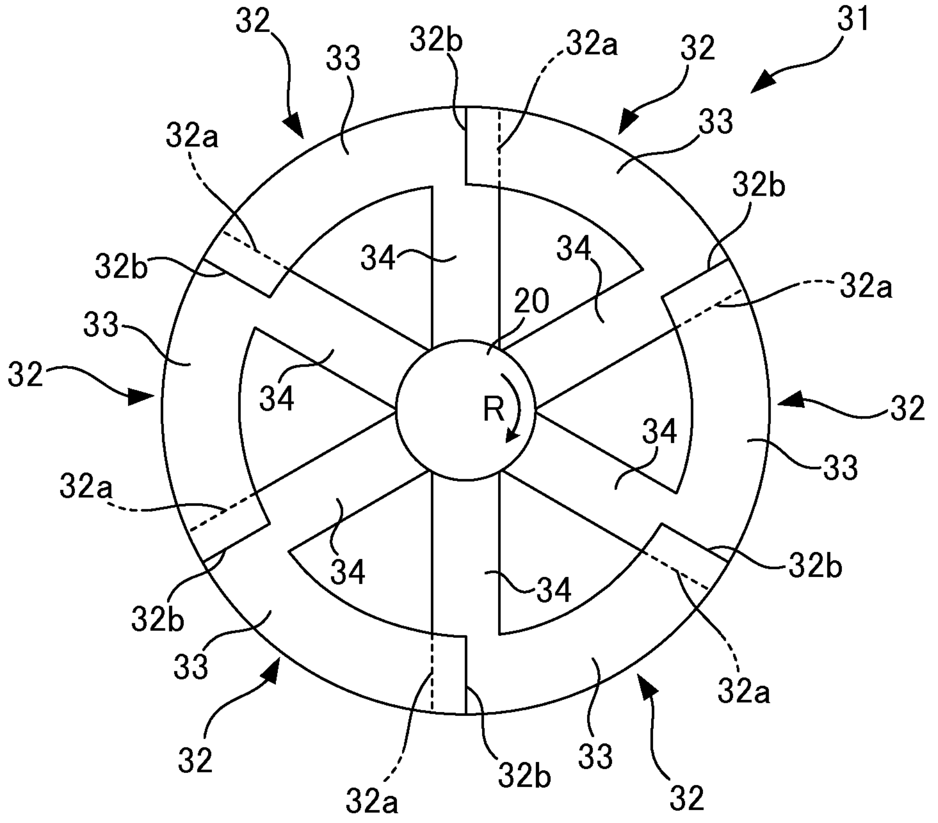
FIG. 13 is a plan view showing a rotating vane assembly at the lowest stage that is provided in the drying apparatus according to the third embodiment of the present invention.
Figure 14:
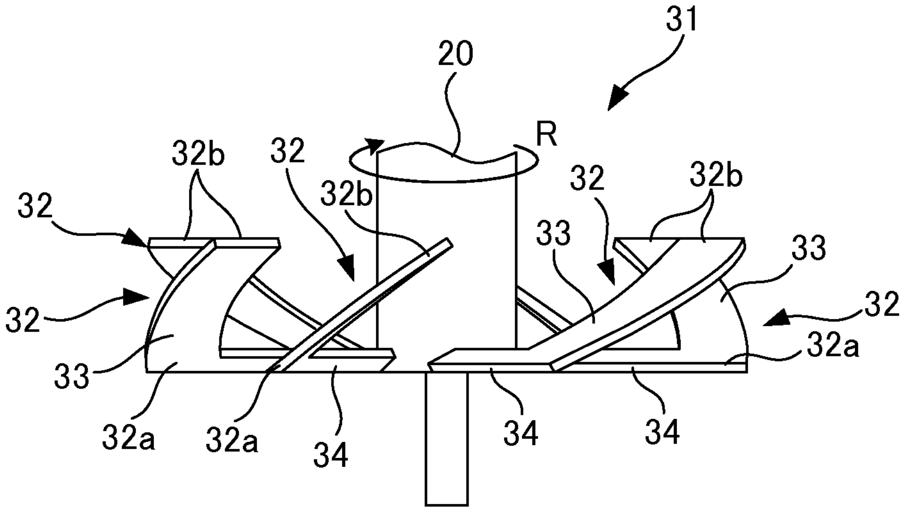
FIG. 14 is a side view showing a rotating vane assembly at the lowest stage that is provided in the drying apparatus according to the third embodiment of the present invention.

As shown in FIG. 13 and FIG. 14, the circular-arc vane sections 32 of the rotating vane assembly 31 at the lowest stage are provided such that they are arranged at equal intervals, each extending from the distal end of the radial spoke 34 which is relevant, being fixed to the rotating axle 20 in a radial manner, the number of which is six in total. The circular-arc vane sections 32 each have the same geometry, each providing a flat surface 33 which extends short in a circumferential direction in a plan view, being capable of placing the material to be dried thereon from one end part 32*a* thereof and moving it to the other end part 32*b* thereof, while raising it.

The flat surface 33 of each circular-arc vane Section 32 is formed so as to extend obliquely upward from one end part 32*a* thereof to the other end part 32*b* thereof in a direction reverse to the rotating direction R, being configured so as to place the material to be dried on the relevant circular-arc vane section 32 to raise it, while pressing it against the heat-transmitting face 12 by the centrifugal force for drying the material to be dried.

The length of the respective circular-arc vane sections. 32 is within a circumferential range of 360 degrees in a plan view, and the other end part 32*b* of the respective circular-arc vane sections 22 is configured such that it is located higher than one end part 32*a* of the other circular-arc vane section 32 which is adjacent thereto in a direction reverse to the rotating direction R, being overlapped thereupon in a plan view. As is the case with the rotating vane assembly 21, the circular-arc vane section 32 and the radial spoke 34 are those which have been integrally formed, being configured by cutting a single metal plate and bending it.

Figure 15:
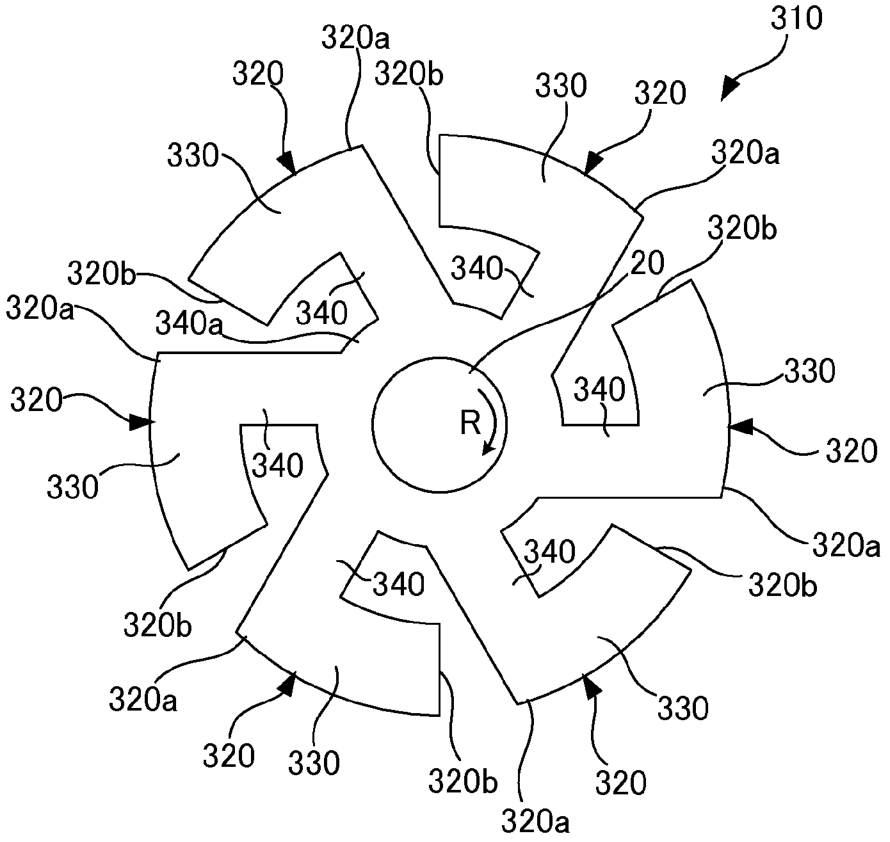
FIG. 15 is a side view showing circular-arc vane sections constituting the rotating vane assembly at a particular stage other than the lowest stage that are provided in the drying apparatus according to the third embodiment of the present invention.
Figure 16:
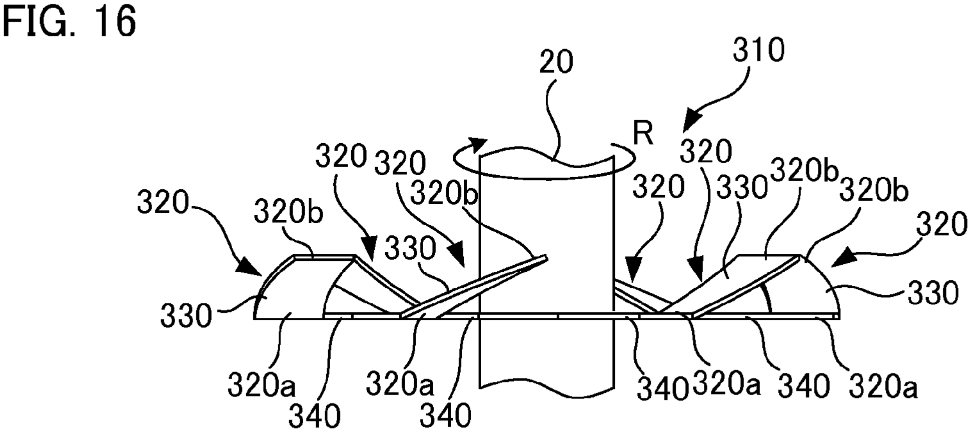
FIG. 16 is a side view showing circular-arc vane sections constituting the rotating vane assembly at a particular stage other than the lowest stage that are provided in the drying apparatus according to the third embodiment of the present invention.

As shown in FIG. 15 and FIG. 16, each circular-arc vane section 320 of the rotating vane assembly 310 at the stages other than that at the lowest stage is connected to the distal end of a radial spoke 340, which extends in a radial manner from the outer periphery of a small disc portion 340*a*. The rotating axle 20 is passed through the small disc portion 340*a*, in which a circular through-hole is formed for fixing it to the rotating axle 20. Six radial spokes 340 are provided in accordance with the number of circular-arc vane sections 320, each of the radial spokes 340 being disposed so as to be developed on a plane orthogonal to the axial direction of the rotating axle 20, with the distal end thereof being integrally connected to one end part 320*a* of the circular-arc vane section 320 which is relevant.

The circular-arc vane sections 320 each have the same geometry, each providing a flat surface 330 which extends short in a circumferential direction in a plan view, being capable of placing the material to be dried thereon from one end part 320*a* thereof and moving it to the other end part 320*b* thereof, while raising it. As is the case with the flat surface 33 of the above-described circular-arc vane section 32, the flat surface 330 of each circular-arc vane section 320 is formed so as to extend obliquely upward from one end part 320*a* thereof to the other end part 320*b* thereof in a direction reverse to the rotating direction R, being configured so as to place the material to be dried on the relevant circular-arc vane section 320 to raise it, while pressing it against the heat-transmitting face 12 by the centrifugal force for drying the material to be dried.

The length of the respective circular-arc vane sections 320 is within a circumferential range of 360 degrees in a plan view, being set such that the flat surfaces 330 of the adjoining circular-arc vane sections 320 will not be overlapped upon each other in a circumferential direction in any portion from one end part 320*a* thereof to the other end part 320*b* thereof. As is the case with the rotating vane assembly 210, the circular-arc vane sections 320, the radial spokes 340, and the small disc portion 340*a* are those which have been integrally formed, being configured by cutting a single metal plate and bending it.

In the present embodiment, any of the circular-arc vane sections 32, 320 is formed shorter than the circular-arc vane sections 22, 220, respectively. Thus, the circular-arc vane section 32, 320 is lower in profile due to the shorter length, thereby being not bulky in a vertical direction, as compared to the circular-arc vane section 22, 220, and therefore even if the number of stages is increased, the overall height of the drying vessel 11 can be suppressed to the lowest possible one. The number of circular-arc vane sections 32, 320 are not limited to six, as described above, and the specific length and lateral width thereof are also design matters which can be appropriately determined.

Also in the present embodiment, as shown in FIG. 12, the clearance F between any two adjoining stages of the stages of the rotating vane assembly 31, 310 is important. By setting the value of such clearance F at 0 to 15% of the diameter of the rotating vane assembly 31, 310, as is the case with the above-described embodiments, the drying process in which, at every stage from the rotating vane assembly 31 at the lowest stage to the rotating vane assembly 310 at the highest stage, the material to be dried is pressed against the heat-transmitting face 12 in a uniform thin film state is repeated in a continuous manner in sequence.

Figure 17:
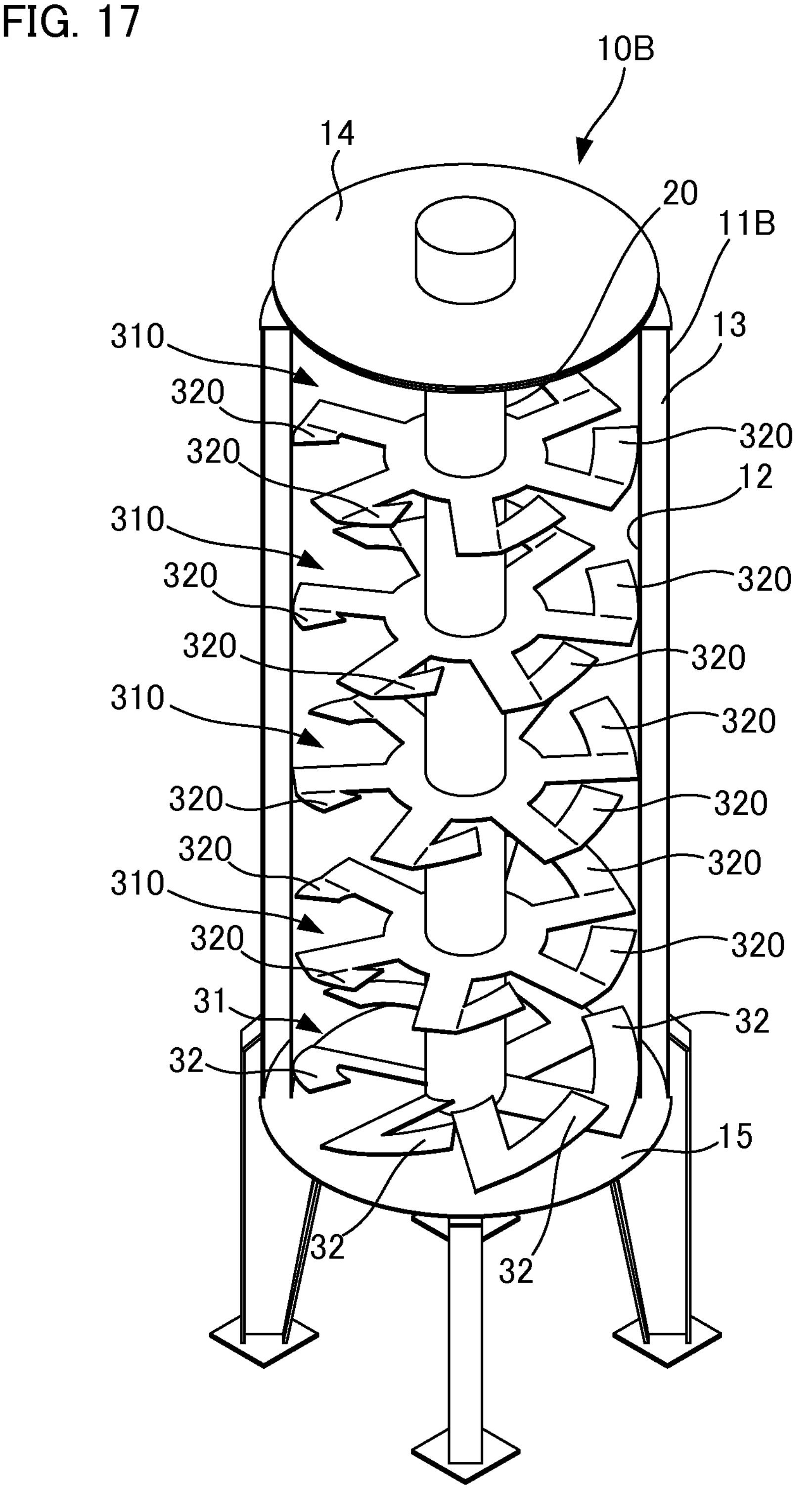
FIG. 17 is a partially sectional perspective view showing the drying apparatus according to the third embodiment of the present invention.
Figure 18:
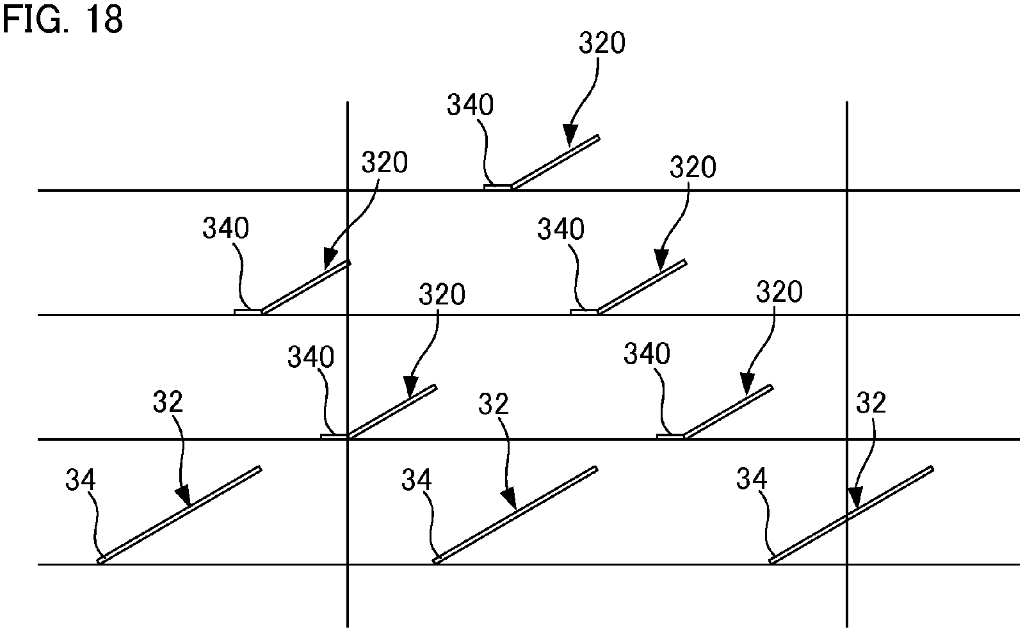
FIG. 18 is a development diagram showing a part of the arrangement of the circular-arc vane sections constituting the rotating vane assembly at the respective stages that are provided in the drying apparatus according to the third embodiment of the present invention.

Further, as shown in FIG. 17 and FIG. 18, with the relative arrangement of the circular-arc vane sections 32, 320 between any two adjoining stages of the stages of the rotating vane assembly 31, 310, as is the case with the above-described embodiments, the circular-arc vane sections 32, 320 at any two adjoining stages are shifted in angular position by a prescribed angle in a plan view, extending in a direction reverse to the rotating direction R, thereby the rotating vane assemblies 31, 310 forming a plurality of stages being disposed in such a manner that they are arranged in the form of a multiple (six-fold in the present embodiment) spiral staircase. With such a special arrangement, it is made possible to effectively utilize the entire face of the heat-transmitting face 12 provided along a vertical direction of the inner wall of the drying vessel 11, whereby an extremely high drying efficiency on the basis of such advantage of the vertical type can be reliably implemented.

Heretofore, the embodiments of the present invention have been described with reference to the drawings, however, the specific configuration is not limited to that of the above-described embodiments, and various changes and modifications may be included in the present invention, so long as they do not depart from the spirit and scope thereof. For example, in the respective embodiments, the rotating vane assemblies 210, 310 at the stages other than the lowest stage, excluding the rotating vane assembly 21, 31 at the lowest stage, are all constituted by a plurality of circular-arc vane sections. 220, 320 having the same geometry and the same degree of inclination, however, when required, they may be adapted so as to be different.

For example, the rotating vane assembly 21, 31 and the rotating vane assembly 210, 310 may be disposed such that they are alternately arranged from the lowest stage. In other words, the length of the circular-arc vane sections 22, 220, 32, 320 of the rotating vane assembly 21, 210, 31, 310 forming at least any one stage of the rotating vane assemblies 21, 210, 31, 310 forming a plurality of stages may be adapted to be different from the length of the circular-arc vane sections 22, 220, 32, 320 of the rotating vane assembly 21, 210, 31, 310 at any other stage, which is not limited to the lowest stage. In this way, the configuration of the circular-arc vane sections 22, 220, 32, 320 can be provided by selecting appropriate configurations and combining them, depending upon the characteristic, quantity, and the like, of the material to be dried which is charged into the drying vessel 11, 11A, 11B.

INDUSTRIAL APPLICABILITY

The drying apparatus in accordance with the present invention can handle a great variety of materials to be dried, including liquid ones, and particularly, it can be widely utilized as a drying apparatus which can efficiently dry even materials to be dried containing a solid substance or semi-solid one, and highly viscous materials to be dried.

DESCRIPTION OF SYMBOLS

10: Drying apparatus
10A: Drying apparatus
10B: Drying apparatus
11: Drying vessel
11A: Drying vessel
11B: Drying vessel
12: Heat-transmitting face
13: Jacket
13*a*: Steam inlet
13*b*: Steam outlet
14: Top cover
15: Bottom plate
16: Feed tube
16*a*: Feed screw
17: Delivery tube
17*a*: Delivery screw
18: Electric motor
20: Rotating axle
21: Rotating vane assembly
22: Circular-arc vane section
23: Flat surface
24: Radial spoke
30: Receiving plate
31: Rotating vane assembly
32: Circular-arc vane section
33: Flat surface
34: Radial spoke
210: Rotating vane assembly
220: Circular-arc vane section
230: Flat surface
240: Radial spoke
310: Rotating vane assembly
320: Circular-arc vane section
330: Flat surface
340: Radial spoke.

The invention claimed is:

1. A drying apparatus (10, 10A, 10B), comprising a vertical cylindrical drying vessel (11, 11A, 115), a material to be dried being charged thereinto; a heating means for heating a heat-transmitting face (12) of the inner wall of said drying vessel (11, 11A, 11B); and a plurality of rotating vane assemblies (21, 210, 31, 310), being mounted to a rotating axle (20) provided in a central area of said drying vessel (11, 11A, 11B) and extending in a vertical direction, said plurality of rotating vane assemblies (21, 210, 31, 310) each being comprised of a plurality of circular-arc vane sections (22, 220, 32, 320) disposed so as to be arranged in a circumferential direction around said rotating axle (20); said plurality of circular-arc vane sections (22, 220, 32, 320) each providing a flat surface (23, 230, 33, 330) extending in a circumferential direction in a plan view, the flat surface (23, 230, 33, 330) being capable of placing the material to be dried thereon from one end part thereof and moving the material to be dried to the other end part thereof while raising the material to be dried, the flat surface (23, 230, 33, 330) being formed so as to extend obliquely upward from one end part thereof to the other end part thereof in a direction reverse to the rotating direction (R) of said rotating axle;

said plurality of rotating vane assemblies (21, 210, 31, 310) being disposed in a plurality of stages vertically arranged along said rotating axle (20), and by revolution of said rotating axle (20), each of said plurality of circular-arc vane sections (22, 220, 32, 320) of each of the rotating vane assemblies (21, 210, 31, 310) forming a plurality of stages being rotated, thereby a drying process moving the material to be dried from one end part to the other end part of the flat surface (23, 230, 33, 330) of each of said plurality of circular-arc vane sections (22, 220, 32, 320) while raising the material to be dried, and pressing the material to be dried against said heat-transmitting face (12) in a thin film state by the centrifugal force being executed;

the clearance (F) between any two adjoining stages of the plurality of stages of the rotating vane assembly (21, 210, 31, 310) being a dimension from the uppermost end at the other end part of a particular circular-arc vane section (22, 220, 32, 320) of a rotating vane assembly (21, 210, 31, 310) to the lowermost end at one end part of a particular circular-arc vane section (220, 320) of the rotating vane assembly (210, 310) one stage thereabove, the dimension being set at 0 to 15% of the diameter of a circle connecting between the adjacent outermost peripheral edges of the flat surfaces (23, 230, 33, 330) of the circular-arc vane sections (22, 220, 32, 320) so as for said drying process to be repeated in a continuous manner in sequence from the rotating vane assembly (21, 31) at the lowest stage to the rotating vane assembly (210, 310) at the highest stage;

above the rotating vane assembly (210) at the highest stage, there being disposed a receiving plate (30) provided on the inner wall of said drying vessel (11) for receiving the material to be dried being moved to above the rotating vane assembly (210) at said highest stage while being pressed against said heat-transmitting face (12) in a thin film state, and causing the material to be dried to be dropped down through the inside of the respective rotating vane assemblies (210), said receiving plate (30) being formed of a plate-like member, a face thereof vertically extending in a small width shape being disposed so as to be faced opposite to the rotating direction (R) of said rotating vane assembly (210), two or more receiving plates (30) being arranged with an equal spacing in a circumferential direction.

2. The drying apparatus according to claim 1, wherein said rotating vane assemblies (21, 210, 310) forming a plurality of stages are disposed in such a manner that they are arranged along said rotating axle (20) in the form of a multiple spiral staircase, the respective circular-arc vane sections (22, 220, 32, 320) at any two adjoining stages being shifted in angular position by a prescribed angle in a plan view, extending in a direction reverse to the rotating direction (R), the flat surface (23, 230, 33, 330) of each circular-arc vane section (22, 220, 32, 320) of said rotating vane assemblies (21, 210, 31, 310) extends in a small-width shape to a certain length within a circumferential range of 360 degrees in a plan view; the length being set to be a length with which the flat surfaces (230, 330) of the adjoining circular-arc vane sections (220, 320) arranged on the same circumference in a plan view of the rotating vane assembly (210, 310) at a particular stage other than the lowest stage will not be overlapped upon each other in a circumferential direction; and with said rotating vane assemblies (21, 210, 31, 310) forming a plurality of stages, the circular-arc vane sections (22, 220, 32, 320) at any two adjoining stages are disposed in such a manner that they are arranged in the form of said multiple spiral staircase, one end part of the upper circular-arc vane section (220, 320) located the closest to the other end part of a particular lower circular-arc vane section (22, 220, 32, 320) in a direction reverse to the rotating direction (R) being shifted toward said reverse direction by a prescribed angle so as for such end parts not to overlap one upon another in a plan view, and being located beneath an inclined plane formed by extending the flat surface at the other end part of said lower circular-arc vane section (22, 220, 32, 320).

* * * * *